US012202289B2

(12) United States Patent
Younkin et al.

(10) Patent No.: US 12,202,289 B2
(45) Date of Patent: Jan. 21, 2025

(54) SUBLIMATION LAYUP SHEET AND METHOD OF SUBLIMATING INK

(71) Applicant: Cricut, Inc., South Jordan, UT (US)

(72) Inventors: Alesha Younkin, South Jordan, UT (US); Cindy Chen, Shenzhen (CN); Elaine Yi, Shenzen (CN); Yan Xiaohan, Shenzen (CN); Danielle Cordsen, South Jordan, UT (US)

(73) Assignee: Cricut, Inc., South Jordan, UT (US)

( * ) Notice: Subject to any disclaimer, the term of this patent is extended or adjusted under 35 U.S.C. 154(b) by 377 days.

(21) Appl. No.: 17/615,752

(22) PCT Filed: Jun. 2, 2020

(86) PCT No.: PCT/US2020/035696
§ 371 (c)(1),
(2) Date: Dec. 1, 2021

(87) PCT Pub. No.: WO2020/247368
PCT Pub. Date: Dec. 10, 2020

(65) Prior Publication Data

US 2022/0305830 A1 Sep. 29, 2022

Related U.S. Application Data

(60) Provisional application No. 62/856,502, filed on Jun. 3, 2019.

(51) Int. Cl.

| | |
|---|---|
| ***B41M 5/035*** | (2006.01) |
| ***B41M 5/41*** | (2006.01) |
| ***B41M 5/42*** | (2006.01) |

(52) U.S. Cl.
CPC .............. *B41M 5/035* (2013.01); *B41M 5/41* (2013.01); *B41M 5/42* (2013.01); *B41M 2205/02* (2013.01); *B41M 2205/30* (2013.01); *B41M 2205/38* (2013.01)

(58) Field of Classification Search
CPC .......... B41M 3/12; B41M 5/035; B41M 5/41; B41M 5/42; B41M 2205/02; B41M 2205/30; B41M 2205/38
See application file for complete search history.

(56) References Cited

U.S. PATENT DOCUMENTS 3,518,158 A * 6/1970 Hurst .................... D21H 19/82 206/447
4,984,517 A 1/1991 Doublet
(Continued)

FOREIGN PATENT DOCUMENTS

CN 101648468 A 2/2010
CN 105829122 A 8/2016
(Continued)

OTHER PUBLICATIONS

International Search Report for International Application No. PCT/US2020/035696, mailed Sep. 16, 2020, 3 pages.
(Continued)

*Primary Examiner* — Gerard Higgins

(57) ABSTRACT

A cut material includes an infusible ink layup, a laminate layer, and a backing layer. The laminate layer is disposed between the infusible ink layup and the backing layer.

14 Claims, 13 Drawing Sheets

(56) References Cited

U.S. PATENT DOCUMENTS

| | | | | |
|---|---|---|---|---|
| 4,984,823 | A * | 1/1991 | Ishii | B41M 5/42 283/81 |
| 5,258,353 | A | 11/1993 | MacDonald | |
| 6,162,517 | A * | 12/2000 | Oshima | B41M 5/38214 503/227 |
| 6,179,337 | B1 * | 1/2001 | Zumberge | B42D 25/20 283/79 |
| 2004/0143914 | A1 | 7/2004 | Flaherty | |
| 2009/0087597 | A1 | 4/2009 | Omata et al. | |
| 2016/0263925 | A1 | 9/2016 | Tanrikulu et al. | |

FOREIGN PATENT DOCUMENTS

| | | | |
|---|---|---|---|
| FR | 2690873 | A1 | 11/1993 |
| GB | 2535733 | A | 8/2016 |
| JP | 2008-100511 | A | 5/2008 |
| JP | 2017-165073 | A | 9/2017 |
| KR | 20020007272 | A * | 1/2002 |
| KR | 20090042111 | A | 4/2009 |
| KR | 10-2013-006225 | A | 6/2013 |
| WO | 2018-179505 | A1 | 10/2018 |

OTHER PUBLICATIONS

International Written Opinion for International Application No. PCT/US2020/035696, mailed Sep. 16, 2020, 5 pages.

* cited by examiner

SUBLIMATION LAYUP SHEET AND METHOD OF SUBLIMATING INK

CROSS-REFERENCE TO RELATED APPLICATIONS

This U.S. patent application is the national phase of International Application No. PCT/US2020/035696, filed Jun. 2, 2020, which claims the benefit of U.S. Application 62/856,502 filed Jun. 3, 2019. The entire contents of these applications are incorporated herein by reference.

TECHNICAL FIELD

This disclosure relates generally to sublimation printing components, apparatuses, systems and methods.

BACKGROUND

This section provides background information related to the present disclosure and is not necessarily prior art.

In general, sublimation is a chemical process where a solid material turns into a gas without going through a liquid stage. Sublimation printing, also known as dye sublimation printing, is a popular printing method for transferring images onto suitable materials.

While known sublimation printing components, apparatuses, systems and methods have proven to be acceptable for various applications, such sublimation printing components, apparatuses, systems and methods are nevertheless susceptible to improvements that may enhance their overall performance and cost. Therefore, a need exists to develop improved sublimation printing components, apparatuses, systems and methods that advance the art.

SUMMARY

This section provides a general summary of the disclosure, and is not a comprehensive disclosure of its full scope or all of its features.

Implementations of the present disclosure relate generally to cut material systems, methods, and apparatus. In particular, the present disclosure relates to pre-mounted ink sublimation cut materials. For example, in one implementation of the present disclosure, a cut material includes an infusible ink layup, a laminate layer, and a backing layer. In such an implementation, the laminate layer is disposed between the infusible ink layup and the backing layer.

Implementations of the disclosure may include one or more of the following optional features. In some implementations, the infusible ink layup comprises an infusible sublimation material layer and a sublimation material carrier layer. The laminate may be disposed against the sublimation material carrier layer. In some implementations, the cut material includes an adhesive layer disposed between the backing layer and the laminate layer. The adhesive layer may removably secure the backing layer to the laminate layer.

In some implementations, the cut material includes a print layer disposed between the backing layer and the laminate layer. In some implementations, the cut material includes an adhesive layer disposed between the print layer and the laminate layer. The print layer and the backing layer may be removably secured to the laminate layer via the adhesive layer.

In some implementations, the cut material includes a print layer. The backing layer may be disposed between the print layer and the laminate layer. In some implementations, the cut material includes an adhesive layer disposed between the backing layer and the laminate layer. The adhesive layer may removably secure the backing layer to the laminate layer.

In one implementation of the present disclosure, a cut material includes an infusible ink layer, a paper layer, a laminate layer, and a backing layer. In such an implementation, the paper layer is disposed between the infusible ink layer and the laminate layer and the laminate layer is disposed between the paper layer and the backing layer.

In one implementation of the present disclosure, a method of infusing ink into an article, includes: providing a cut material comprising an ink sublimation layup and a backing layer, the ink sublimation layup comprising sublimation ink; performing a cutting operation on the cut material; removing a portion of the ink sublimation layup from the backing layer of the cut material; placing the ink sublimation layup against an article; and sublimating the sublimation ink into the article.

Another aspect of the disclosure provides a cut material. The cut material may include an infusible sublimation material layer, a backing layer, a sublimation material carrier layer disposed between the infusible sublimation material layer and the backing layer, and a laminate layer disposed between the sublimation material carrier layer and the backing layer.

This aspect may include one or more of the following optional features. In some implementations, the laminate layer comprises pulp and calcium carbonate.

In some implementations, the laminate layer is between about 40-60 $g/m^2$.

In some implementations, the laminate layer comprises a silicone oil coating disposed between the laminate layer and the backing layer.

In some implementations, the backing layer comprises PET.

In some implementations, a thickness of the backing layer is between about 40-60 μm.

In some implementations, the cut material comprises an adhesive layer disposed between the laminate layer and the backing layer. The adhesive layer may comprise a pressure sensitive adhesive.

Another aspect of the disclosure provides a method of infusing ink. The method may comprise cutting a cut material. The cut material may comprise an ink sublimation layup and a backing layer. The ink sublimation layup may comprise sublimation ink. The method may also include removing a first portion of the ink sublimation layup from the backing layer of the cut material. The method may further include placing the cut material against an article. The method may also include sublimating the sublimation ink of a second portion of the sublimation ink layup into the article.

This aspect may include one or more of the following optional features. In some implementations, the cut material further comprises a laminate layer disposed between the ink sublimation layup and the backing layer. Cutting the cut material may comprise cutting through the ink sublimation layup but not through the backing layer.

In some implementations, the method includes removing a portion of the laminate layer from the backing layer after cutting the cut material. The portion of the laminate layer being removed from the backing layer may correspond in position with, and be removably secured to, the first portion of the ink sublimation layup removed from the backing layer.

Each of the above independent implementations of the present disclosure, and those implementations described in the detailed description below, may include any of the features, options, and possibilities set out in the present disclosure and figures, including those under the other independent implementations, and may also include any combination of any of the features, options, and possibilities set out in the present disclosure and figures.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

FIG. 2' is another cross-sectional view of the layup sheet of FIG. 2 arranged in a partially separated orientation, according to the principles of the present disclosure.

FIG. 11' is another cross-sectional view according to FIG. 11 illustrating the sublimation material layer of the layup sheet arranged in a post-sublimated orientation that is sublimated into the workpiece.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Implementations of the present disclosure relate generally to sublimation printing components, apparatuses, systems and methods. In some examples, the present disclosure describes configurations of layup sheets including sublimation ink.

For example, some aspects described herein are configured for ink sublimation projects that are easily created and highly customizable before and after printing and/or cutting the material with, for example processing equipment (see, e.g., sheet processing device 100 in FIGS. 1 and 3-7).

In some instances, layup sheets may be processed (e.g., cut, worked with, or the like) and stored at a user's residence or home without the need for utilizing expensive and complex industrial equipment, machines, or storage facilities.

In at least one aspect of the present disclosure, cut materials minimizes the risk of damage to customized sublimation prints and minimizes unwanted alterations thereto during handling and use.

In some implementations, the disclosure describes configurations of layup sheets that may include a plurality of layers (e.g., two or more of a sublimation material layer, a laminated layer, and a backing layer) to provide a more robust material for improved handling, transportation, and storage.

In some instances, the disclosure describes exemplary layup sheets that, once processed (e.g., cut) by processing equipment 100, provides for easy "weedability" (i.e., the ability to remove unwanted portions of cut material from a backing layer of the layup sheet) such that design elements of a sublimation print of the layup sheet are maintained in position during handling and sublimation but also easily re-arrangeable as desired).

In other implementations, the disclosure describes exemplary layup sheets that are less susceptible to curling during or at least excessively curling during handling, transportation, and storage.

Figure 1:
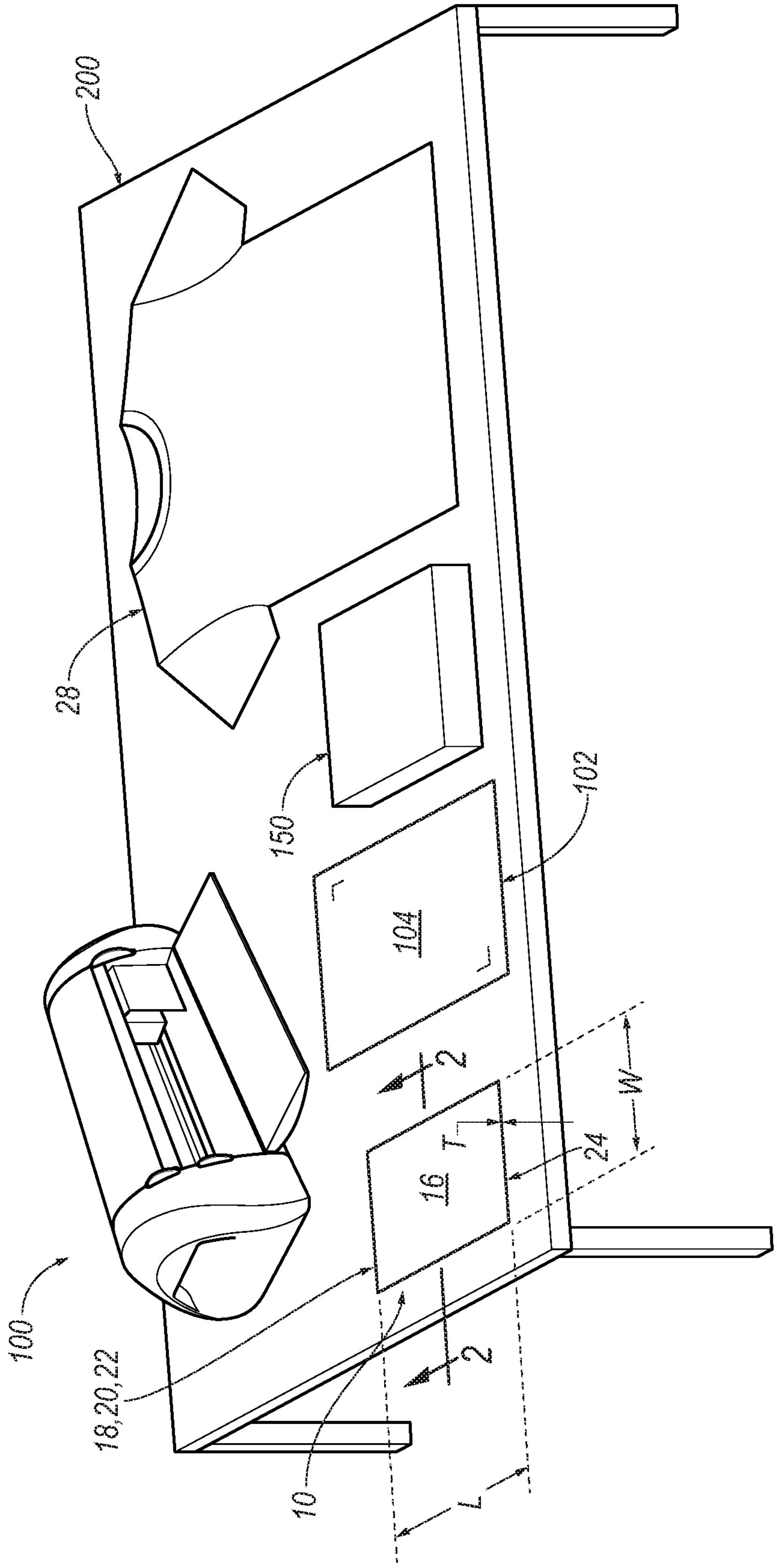
FIG. 1 is a perspective view of a sublimation system including a layup sheet, a processing device, a cutting mat, a heating device, and a workpiece arranged upon a table, according to the principles of the present disclosure.
Figure 2:
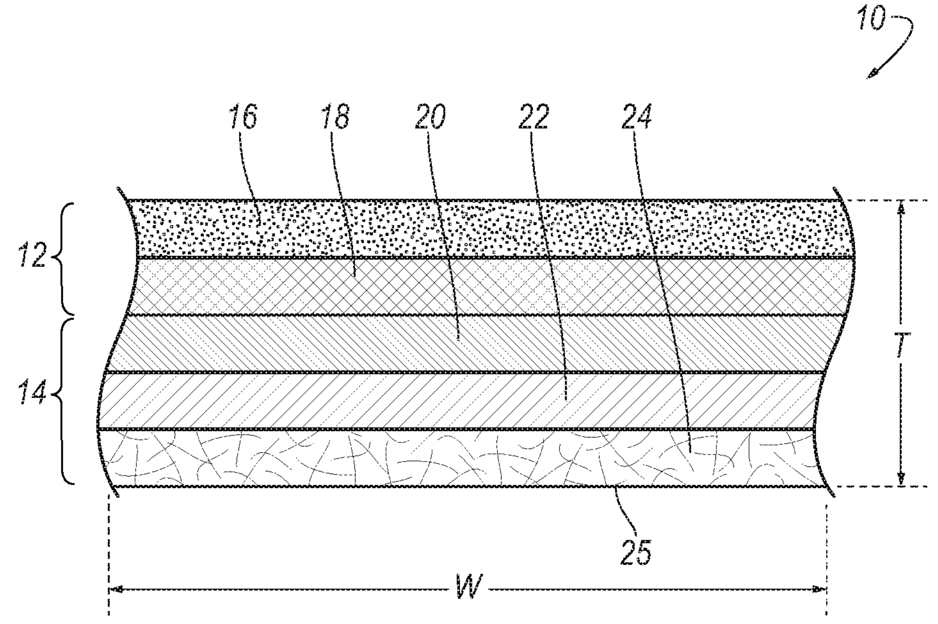
FIG. 2 is a cross-sectional view of the layup sheet according to line 2-2 of FIG. 1.
Figure 2:
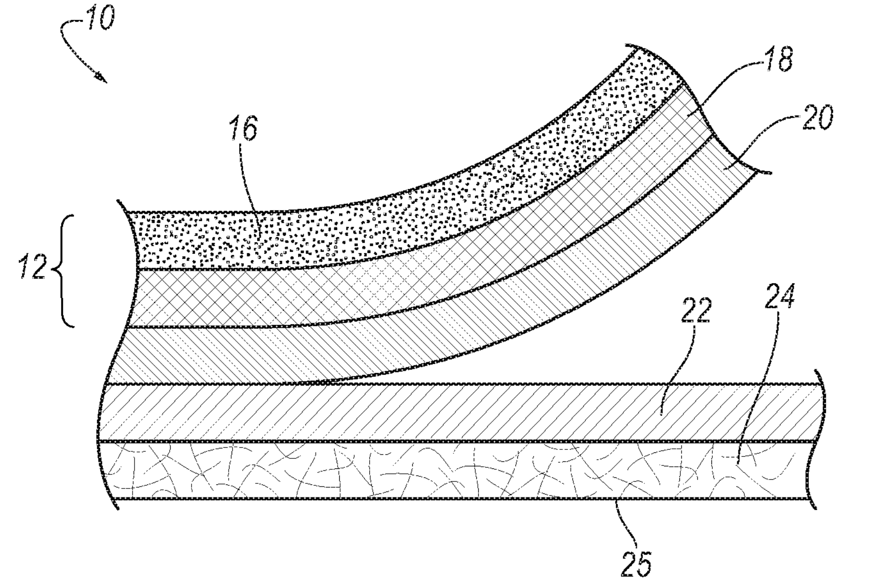

With reference to FIGS. 1-2, a layup sheet is shown generally at 10. As seen at FIG. 2, the layup sheet 10 may include a plurality of distinct layers (see, e.g., layers 16, 18, 20, 22, and 24 in FIG. 2) disposed together to form a single layup. The term "layup," as used herein, may define multiple layers that are disposed together or adjacent one another. Two or more layers of the plurality of layers 16, 18, 20, 22, and 24 forming the layup sheet 10 may be separable or separated (see, e.g., FIG. 2'). Furthermore, when two or more layers of plurality of layers 16, 18, 20, 22, and 24 of the layup sheet 10 are acted upon (e.g., by heat or mechanical force), the two or more layers of plurality of layers 16, 18, 20, 22, and 24 of the layup sheet 10 generally remain together to form a single functional sheet of material when handled or used.

With continued reference to FIG. 1, a system including a plurality of components associated with the layup sheet 10 for performing a method (see, e.g., 32 at FIG. 13) are also shown. For example, in addition to the layup sheet 10, the system may also include, for example: a workpiece 28 (e.g., a cloth article, a ceramic article, or the like) that is also seen at, for example, FIGS. 3 and 10-12D; and a heating device 150 (see also, e.g., FIGS. 3 and 10-12D). In other implementations, the system may further include, for example, a processing device 100 (e.g., a home cutting machine); and a cutting mat 102 (see also, e.g., FIGS. 3-9). In yet other implementations, the system may further include, for example, a support surface or table 200. The components of the system and how they are interfaced with or work upon the layup sheet 10 will be described in greater detail in the following disclosure.

With reference to FIG. 2, in some configurations, the layup sheet 10 may include a plurality of layers of material defined by five distinct layers of material 16, 18, 20, 22, 24. The plurality of layers of material 16, 18, 20, 22, 24 are stacked upon or disposed adjacent one another for defining a thickness T of the layup sheet 10. A length L (see, e.g., FIG. 1) and a width W (see, e.g., FIG. 1) of the layup sheet 10 may be, for example, 8.5"×11", 12"×12", or the like, while the thickness T of the layup sheet 10 may be on the order of less than a millimeter or a few millimeters.

With reference to FIGS. 2-8 and 11-11', each layer of the plurality of layers of material 16, 18, 20, 22, 24 of the layup sheet 10 are illustrated to have an approximately equal thickness; each layer of the plurality of layers of material 16, 18, 20, 22, 24, however, may be defined by a different thickness.

As seen at FIG. 2, the several layers 16, 18, 20, 22, 24 of the layup sheet 10 may be grouped into separate layups 12, 14. For example, the layers 16, 18 of the plurality of layers of material 16, 18, 20, 22, 24 may be define a sublimation layup 12, and, the layers of material 20, 22, 24 of the plurality of layers of material 16, 18, 20, 22, 24 may be define a support layup 14. In general, the ink sublimation layup 12 provides a sublimation ink (see, e.g., layer of material 16) and a sublimation ink carrier material (see, e.g., layer of material 18) to enable the sublimation of a design or artwork into an article (see, e.g., workpiece layer of material 28 at FIGS. 11-11', which may be, for example, a cloth article or ceramic article) when acted upon by heat (see, e.g., arrows 30 at FIGS. 11 and 12B) and/or pressure from a heating device (see, e.g., heating device 150 at FIG. 11). The transfer, by sublimation, of sublimation ink 16 from sublimation layup 12 into an article (see, e.g., workpiece layer of material 28 at FIGS. 11-11') will be described in more detail below.

The support layup 14 is configured to provide the layup sheet 10 with rigidity for handling the sublimation layup 12. The support layup 14 may include a carrier material or backing material (see, e.g., layer of material 24), a barrier material or laminate material (see, e.g., layer of material 20). The support layup 14 may improve/enable: (1) a user to successfully perform cutting of the sublimation layup 12 with a processing device 100; and (2) sublimation processes of the sublimation layup 12 conducted by the heating device 150

In some configurations, with reference to FIG. 2, the sublimation layup 12 includes: (1) sublimation material layer 16; and (2) a sublimation material carrier layer 18. In some instances, the support layup 14 may include: (1) a laminate layer 20; (2) an adhesive layer 22; and (3) a backing layer 24. As seen at FIG. 2, the sublimation material carrier layer 18 disposed between sublimation material layer 16 and the laminate layer 20. The laminate layer 20 is disposed between the sublimation material carrier layer 18 and the adhesive layer 22. The adhesive layer 22 is disposed between laminate layer 20 and the backing layer 24.

In some configurations, the sublimation material carrier layer 18 may include, for example, a paper-based material. The sublimation material layer 16 that is carried by the sublimation material carrier layer 18 may include, for example, an ink, such as a sublimation ink.

Figure 11:
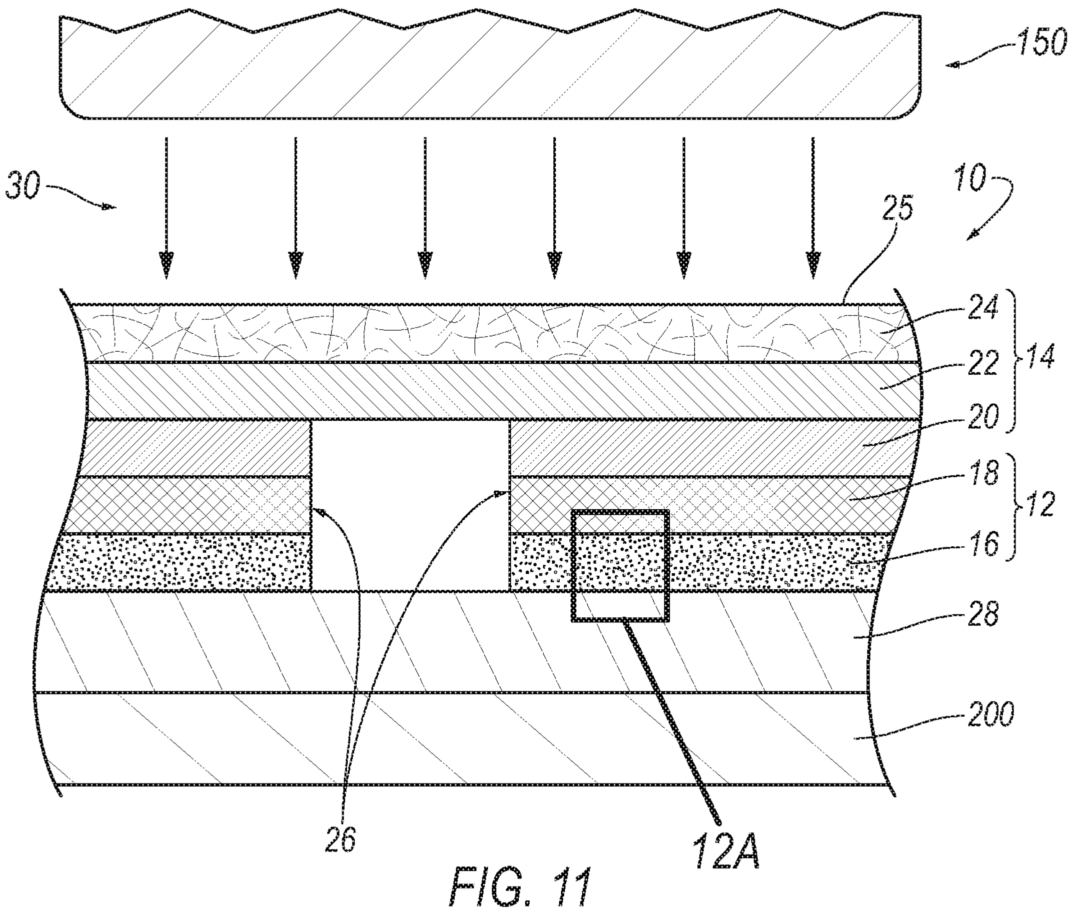
FIG. 11 is a cross-sectional view according to line 11-11 of FIG. 10 illustrating a sublimation material layer of the layup sheet arranged in a pre-sublimated orientation relative the workpiece.
Figure 11:
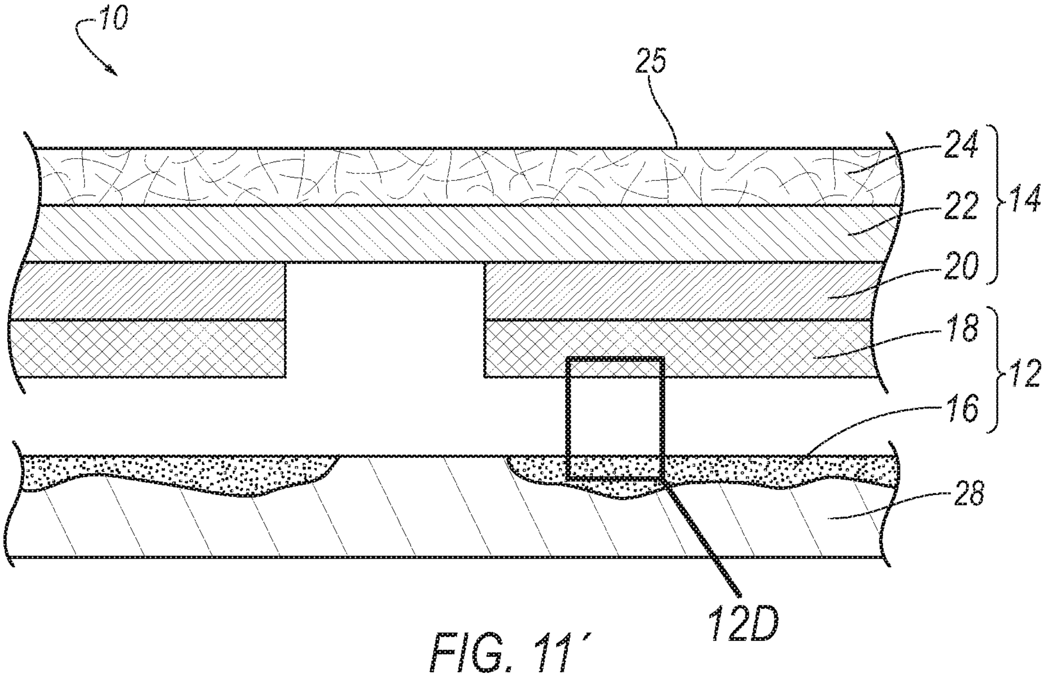
Figure 12A:
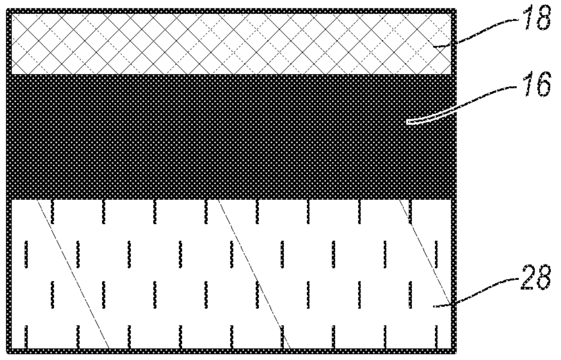
FIG. 12A is an enlarged view according to line 12A of FIG. 11.
Figure 12B:
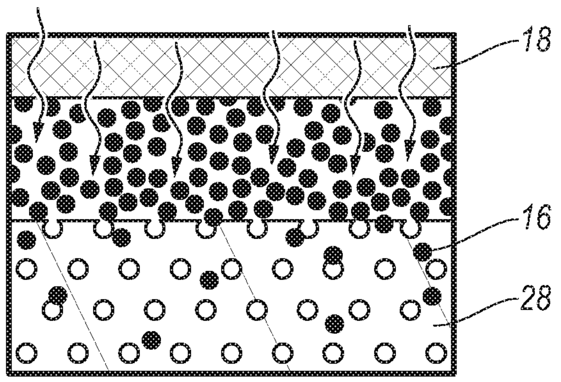
FIG. 12B is another enlarged view according to FIG. 12A.

With respect to the sublimation material layer 16, an act of "sublimation" (see, e.g., FIGS. 12A-12D) may be defined as a chemical process where a solid material (defining the sublimation material layer 16) as seen at FIG. 12A turns into a gas (see, e.g., FIG. 12B) without going through a liquid stage. "Sublimation printing," which may also be referred to as "dye sublimation printing," may be utilized for transferring images onto suitable materials. Upon arranging the sublimation material carrier layer 18 (including the sublimation material layer 16 disposed thereon) proximate the heating device 150 that produces heat 30 (see, e.g., FIGS. 11 and 12B), the sublimation material layer 16 changes from: (1) a solid state disposed upon the sublimation material carrier layer 18 as seen at FIG. 12A; and then to (2) a gaseous state as seen at FIG. 12B that permeates into, for example, fibers of the workpiece 28 (see, e.g., FIGS. 11' and 12C-12D).

Figure 12C:
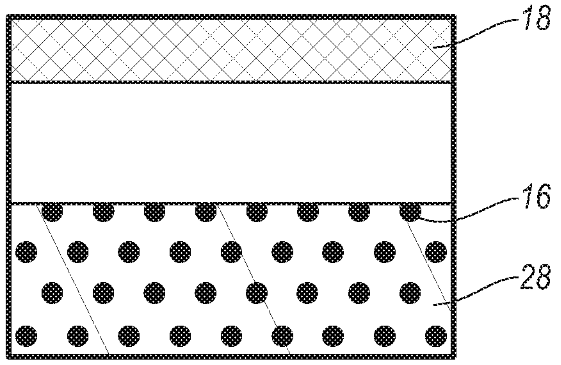
FIG. 12C is another enlarged view according to FIG. 12B.
Figure 12D:
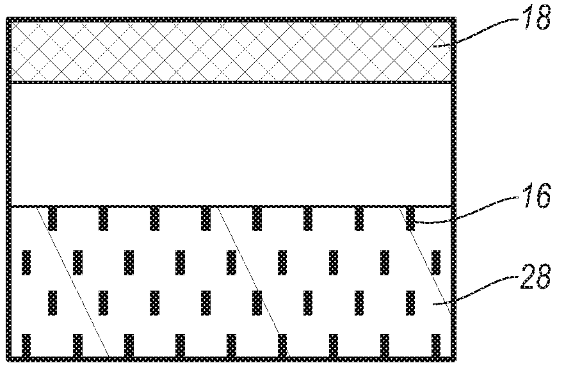
FIG. 12D is another enlarged view according to FIG. 12C and also according to line 12D of FIG. 11'.

When the heat 30 is removed from the sublimation material carrier layer 18 and the workpiece 28, the sublimation material layer 16 that transitioned from a solid state (as seen at, e.g., FIG. 12A) to a gaseous state (as seen at, e.g., FIG. 12B) that permeated into the workpiece 28 (as seen at, e.g., FIGS. 12C-12D) is permanently set into place by within the workpiece 28 (as seen at FIG. 12D). Furthermore, with reference to FIGS. 12A-12B, not only does the heat 30 release change the state of the sublimation material layer 16, but it may also open, for example, pores of the material defining the workpiece 28 that receives the sublimation material layer 16 (as seen at, e.g., FIG. 12C) that changed from a solid state to a gaseous state. Once the heat 30 and pressure is released, the sublimation material layer 16 that is "gassed" into the workpiece 28 returns to the solid state, and, as seen at FIGS. 12C-12D, the pores of the workpiece 28 transitions from the open state back to the closed state, thereby trapping the sublimation material layer 16 within the workpiece 28 as seen at FIG. 12D.

The thicknesses and specific material compositions of each layer of the plurality of layers of material 16, 18, 20, 22, 24 of implementations of the layup sheet 10 in combination with thicknesses and materials of other layers (such as, e.g., the thickness and/or material of the workpiece 28, achieve a number of advantages are achieved. For example, the selected materials and/or thicknesses of each layer of the plurality of layers of material 16, 18, 20, 22, 24 of the layup sheet 10 enable proper heat transfer there-through to effectuate a successful sublimation of the sublimation material layer 16 into the workpiece 28, such as a cloth article or ceramic article.

Also, in some instances, the thickness and/or selected material of each layer of the plurality of layers of material 16, 18, 20, 22, 24 of the layup sheet 10 affects the rigidity of the layup sheet 10, which may provide a user with advantageous handling and storage options discussed herein. Furthermore, in some examples, the selected material and/or thickness of each layer of the plurality of layers of material 16, 18, 20, 22, 24 of the layup sheet 10 affects the permeability of certain barrier layers so that the sublimation material layer 16 sublimates into the workpiece 28 successfully during use and does not damage heat press surfaces of the heating device 150 or other equipment used during sublimation processes. Yet even further, in some implementations, the selected material and/or thickness of each layer of the plurality of layers of material 16, 18, 20, 22, 24 of the layup sheet 10 affects the peel force and/or adhesion force of, for example, the adhesive layer 22). Thus, the selected material and/or thicknesses of each layer of the plurality of layers of material 16, 18, 20, 22, 24 of the layup sheet 10 described herein may be chosen to provide an optimal solution for provided a modified workpiece 28 with a design including at least a portion of the sublimation material layer 16 of the sublimation layup 12 of the layup sheet 10.

With reference to FIG. 2, the sublimation material layer 16 of the sublimation layup 12 may include one or more sublimation inks, dye particles, or the like. For example, in some configurations, the sublimation material layer 16 includes sublimation ink comprising diglycol, glycerol, and water. In other configurations, the sublimation material layer 16 may also include dye particles. In yet other configurations, the sublimation material layer 16 may include other ingredients, which may include those mentioned above, that act to stabilize the dye particles in a solution defining the sublimation material layer 16.

In some examples, the composition of the materials forming the sublimation material layer 16 may include a diglycol component of ranging between about 0.15%-1.65% by weight of the layup sheet 10. In other implementations, the composition of the material forming the sublimation material layer 16 may include a diglycol component ranging between about 0.3%-1.5% by weight of the layup sheet 10.

In other examples, the composition of the materials forming the sublimation material 16 may include a glycerol component ranging between about 0.99%-2.31% by weight of the layup sheet 10. In other implementations, the composition of the material forming the sublimation material layer 16 may include a glycerol component ranging between about 1.2%-2.1% by weight of the layup sheet 10.

In yet other examples, the composition of the materials forming the sublimation material 16 may include a water component ranging between about 0.84%-3.96% by weight of the layup sheet 10. In other implementations, the composition of the material forming the sublimation material layer 16 may include a water component ranging between about 1.2%-3.6% by weight of the layup sheet 10.

According to the exemplary implementations of the sublimation material layer 16 described above, in some configurations, the composition of the materials forming the sublimation material layer 16 may be range between about 1.98%-7.92% by weight of the layup sheet 10. In other configurations, the composition of the materials forming the sublimation material layer 16 may range between about 2.7%-7.2% by weight of the layup sheet 10. The described sublimation material layer 16 and its component compounds are given as examples of suitable types of compositions for forming sublimation inks of the sublimation material layer 16 that may be incorporated into the design of the layup sheet 10.

In some examples, the sublimation material carrier layer 18 may include one or a combination of a woody fiber, a pigment, and a binder. In some configurations, a woody fiber may include carbon and oxygen that ranges between about 26.7%-37.3% by weight of the layup sheet 10. In other configurations, the woody fiber including carbon and oxygen may range between about 30.1%-33.9% by weight of the layup sheet 10.

In some examples, the pigment may include silicone that ranges between about 0.8%-3.3% by weight of the layup sheet 10. In other examples, the pigment including silicone that ranges between about 1.1%-3.0% by weight of the layup sheet 10.

In some implementations, the binder may include polyvinyl alcohol, or the like, and range between about 0.8%-3.3% by weight of the layup sheet 10. In other implementations, the binder including polyvinyl alcohol may range between about 1.1%-3.0% by weight of the layup sheet 10.

According to the exemplary implementations of the sublimation material carrier layer 18 described above, the sublimation material carrier layer 18 may range between about 28.3%-43.9% by weight of the layup sheet 10. In other configurations, the sublimation material carrier layer 18 may range between about 32.3%-39.9% by weight of the layup sheet 10. The described sublimation material carrier layer 18 and its component compounds are given as exemplary types of sublimation paper of the sublimation material carrier layer 18 that may be used in the design of the layup sheet 10. Other material compositions defining other types of sublimation papers may also be utilized of the design of the sublimation material carrier layer 18.

During formation of the sublimation layup 12, the sublimation material layer 16 may be printed onto (and is therefore disposed upon) an outer surface of the sublimation material carrier layer 18. In other implementations, however, some or all of the sublimation material layer 16 may be impregnated or disposed within at least a portion of the thickness of the sublimation material carrier layer 18 such that sublimation material carrier layer 18 and sublimation material layer 16 form one layer of material defined by the thickness of the sublimation material carrier layer 18.

In at least one embodiment, the sublimation layup 12 is between about 80-120 grams-per-meter squared ($g/m^2$). In some implementations, the sublimation layup 12 may be between about 90-110 grams-per-meter squared ($g/m^2$). In other implementations, the sublimation layup 12 may be between about 97-103 $g/m^2$. In yet other implementations, the sublimation layup 12 may be between about 100 $g/m^2$. As such, in some configurations, the sublimation layup 12 may be between about 30.3%-51.5% by weight of the layup sheet 10. In other configurations, the sublimation layup 12 may be between about 35%-47.1% by weight of the layup sheet 10.

With reference to FIG. 2, in some implementations, the layup sheet 10, the laminate layer 20 is disposed between the sublimation material carrier layer 18 and the adhesive layer 22. The laminate layer 20 provides a barrier between the sublimation layup 12 and other layers, such as, for example, the adhesive layer 22 and the backing layer 24. In this exemplary configuration, the laminate layer 20 may mitigate or reduce the likelihood of the sublimation material layer 16 from sublimating or otherwise transferring to other layers of the layup sheet 10, such as, for example, the backing layer 24, and, furthermore onto other devices, such as, for example the heating device 150 or other equipment, which may come into contact with the layup sheet 10 during the sublimation of the sublimation material layer 16 into the workpiece 28. In some examples, as will be described in more detail below, during the sublimation process, a heat plate of the heating device 150 may come into contact with the backing layer 24 of the layup sheet 10 to heat 30 (see, e.g., FIGS. 11 and 12B) the sublimation layup 12 and cause the sublimation material layer 16 to sublimate into the workpiece 28. During contact of the heat plate of the heating device 150 with the layup sheet 10, the laminate layer 20 functions as a barrier to prevent or reduce the heated sublimation material layer 16 from transferring or sublimating onto the heat plate of the heating device 150; the heat plate is thereby insulated and protected from damage by the laminate layer 20. Accordingly, the sublimation ink of sublimation material layer 16 will be pressed into and directed to sublimate into the workpiece 28.

In addition to the aforementioned functionality provided by the laminate layer 20, the laminate layer 20 also provides weeding capabilities. For example, during the process of transferring an image or design from the sublimation layer 16 of the layup sheet 10 to the workpiece 28, the layup sheet 10 may be interfaced with the processing device 100 and undergo a cutting operation in order to cut 26 (see, e.g., FIGS. 6-7) and then selectively remove (see, e.g., FIGS. 8-9) one or more layers or portions of the sublimation layup 12 from the layup sheet 10. Accordingly, the laminate layer 20 enables a user to easily and quickly remove (see, e.g., FIGS. 8-9) one or more layers or portions of the sublimation layup 12 from the layup sheet 10.

With reference to FIG. 2', an exemplary removal of the laminate layer 20 from the backing layer 24 is illustrated. In some configurations, the laminate layer 20 may be removably secured to the backing layer 24 with an adhesive layer 22.

As shown at FIG. 2', the laminate layer 20 can be peeled from the adhesive layer 22, which, in some implementations, may result in in one or more portions or layers of the sublimation layup 12 that is secured to the laminate layer 20 also being removed as the laminate layer 20 is peeled from the adhesive layer 22. In some implementations, a permanent glue (not shown), that, in some configurations may define a relatively smaller thickness (compared to other layers of the layup sheet 10) may be disposed between the laminate layer 20 and the sublimation material carrier layer 18 (or the sublimation layup 12 in general) so that any removal of the laminate layer 20 also results in removal of one or more portions or layers of the sublimation layup 12.

Accordingly, in some instances, the laminate layer 20 may define or form a layer or coating on the sublimation material carrier layer 18 that interfaces with adhesive layer 22. As stated above, the material defining the laminate layer 20 allows the laminate layer 20 to be easily separated from the adhesive layer 22 after, for example, a cutting operation has been performed on the layup sheet 10 by the processing device 100. For example, portions of the laminate layer 20 may be removed as uniform, complete portions of material from the adhesive layer 22 along with corresponding portions of the sublimation layup 12 that is secured to the removed laminate layer 20, which may be carried out without tearing or otherwise damaging any remaining portion of the sublimation layup 12 that has not been removed. Thus, the laminate layer 20 of the layup sheet 10 is configured in a manner to permit a user to cleanly and easily remove certain portions of the sublimation layer 12 from the layup sheet 10 (i.e., "weed" the layup sheet 10) after the layup sheet 10 has been subjected to a cutting operation (e.g., that was performed by the processing device 100) in order to form customized designs for sublimation into articles.

Although some configurations of the layup sheet 10 may include the laminate layer 20, some configurations could be practiced without the laminate layer 20 (e.g., the laminate layer 20 could be optional). In such configurations, however, separating the sublimation material carrier layer 18 from backing layer 24 and the adhesive layer 22 without the presence of the laminate layer 20 may, in some but not all instances, introduce inconsistent results, such as, for example, torn portions or partial portions of the sublimation material carrier layer 18 remaining with the layup sheet 10 after weeding. Accordingly, in some configurations, the material defining the sublimation material carrier layer 18 may not otherwise cleanly peel away from the adhesive layer 22 if it was to be arranged in direct contact with the adhesive layer 22; when such exemplary configuration are provided, a portion of the thickness of the sublimation material carrier layer 18 may undesirably remain upon the adhesive layer 22 when the sublimation layup 12 is peeled away from the backing layer 24 (i.e., in the absence of providing the laminate layer 20), thereby leaving residual portions of the sublimation layup 12 upon the adhesive layer 22.

After the cut 26 (see, e.g., FIG. 7) layup sheet 10 is weeded, the laminate layer 20 of remaining portions of the cut 26 layup sheet 10, which may be part of the desired design to be sublimated into the workpiece 28, can be removed and reapplied to adhesive layer 22 so that such portions of a user's design can be rearranged and reoriented as desired. In this way, a user can alter custom designs as needed and maintain those portions of the design, whether rearranged or not, in relative positions on cut material during handling and sublimation processes.

Furthermore, in configurations of the layup sheet 10 including the laminate layer 20, such configurations may improve the quality of one or more cuts 26 defined by the layup sheet 10 when the layup sheet 10 is operated on by the processing device 100. In some instances, the blade 101 (FIGS. 5 and 7) of the processing device 100 may be set to cut into the thickness of the layup sheet 10 at a depth or distance that extends all the way through, for example, the sublimation layup 12, which may include the thickness of the sublimation material carrier layer 18 and the thickness of the laminate layer 20. In this way, and because of the material properties of, for example: silicone; pulp; and/or calcium carbonate, which may define materials that are selected for forming the laminate layer 20, some configurations of the layup sheet 10 may provide one or more layers that may be cut cleanly without tearing (even when intricate, small shapes are being cut). In some configurations of the layup sheet 10 that does not include the laminate layer 20, the sublimation material carrier layer 18 may, but not always, tear when impinged upon by the blade 101 of the processing device 100.

Some configurations of the laminate layer 20 may be defined by one or more materials that comprise, for example: pulp; and calcium carbonate. In other configurations, the laminate layer 20 may be defined by one or more materials that comprise, for example: pulp, calcium carbonate; and silicone; in such configurations, the silicone material component may be in the form of a silicone coating that faces or is arranged opposite or adjacent the backing layer 24, or, alternatively, between and in adjacent contact with both of the laminate layer 20 and the adhesive layer 22 as seen at, for example, FIG. 2. Inclusion of the silicone coating material in the design of the laminate layer 20 may improves the releaseability of the laminate layer 20 from the adhesive layer 22 during weeding.

In some implementations, the laminate layer 20 may be between about 20%-26% by weight of the layup sheet 10. In other implementations, the laminate layer 20 may be about 23% by weight of the layup sheet 10. In some examples, the laminate layer 20 may be between about 40 g/m$^2$–60 g/m$^2$. In other examples, the laminate layer 20 may be between about 45 g/m$^2$–55 g/m$^2$. In yet other examples, the laminate layer 20 may be about, for example, 50 g/m$^2$.

In some configurations, a combined thickness of the laminate layer 20 and the sublimation layup 12 may be between about 0.17 mm-0.25 mm. In other configurations, the combined thickness of the laminate layer 20 and the sublimation layup 12 may be between about 0.23 mm-0.19 mm. In yet other configurations, the combined thickness of the laminate layer 20 and the sublimation layup 12 may be about, for example, 0.21 mm.

In some configurations, the layup sheet 10 may optionally include at least one adhesive layer 22. The adhesive layer 22 may be disposed between and connect the laminate layer 20 to the backing layer 24. The adhesive layer 22 removably-secures the laminate layer 20 to the backing layer 24 so that the layup sheet 10 may be handled and stored as a single sheet of material. However, in some examples, during the sublimation process, a user may peel away the laminate layer 20 from the adhesive layer 22 to separate one or more portions of the sublimation layup 12 from one or more other layers defining the layup sheet 10. In some implementations, the adhesive layer 22 may be defined by a pressure sensitive adhesive.

In order to provide the layup sheet 10 with weeding, peeling, and holding power (of adjacent layers) functionality described above, the materials that define the adhesive layer 22 may be quantified by one or more exemplary a "peel forces" (e.g., a force that results in the laminate layer 20 separating from the adhesive layer 22), as follows. In some configurations, the material that defines the adhesive layer 22 may be defined by a peel force between about 15 gram-force/25-millimeters (gf/25 mm)-60 gf/25 mm. In other configurations, the material that defines the adhesive layer 22 may be defined by a peel force between about 20 gf/25 mm-55 gf/25 mm. In yet other configurations, the material that defined the adhesive layer 22 may be defined by a peel force between about 25 gf/25 mm-50 gf/25 mm.

In some implementations, the adhesive layer 22 may be defined by an acrylic polymer adhesive. In some configurations, the adhesive layer 22 may be between about 12%-16% by weight of the layup sheet 10. In other configurations, the adhesive layer 22 may be between about 13%-15% by weight of the layup sheet 10. In yet other configurations, the adhesive layer 22 may be about 14% by weight of the layup sheet 10. Furthermore, in some examples, the adhesive layer 22 may be between about 12 μm 18 μm. In other examples, the adhesive layer 22 may be between about 13.5 μm-16.5 μm. In yet other examples, the adhesive layer 22 may be about 15 μm.

With reference to FIG. 2, some configurations of the layup sheet 10 may also include the backing layer 24, which may be alternatively referred to as: a support layer; a release layer; or a layer portion that is disposed on a first surface of the adhesive layer 22 that opposite a second surface of the adhesive layer 22 that is disposed on the laminate layer 20. In some instances, the backing layer 24 provides structural rigidity that promotes, for example, handling or cutting operations when, for example, the layup sheet 10 is interfaced with a home-use cutting machine, such as, for example, the processing device 100. In other instances, the backing layer 24 may also provide a base portion layer from which the laminate layer 22 can be separated after, for example, a cutting operation has been performed by the processing device 100 on the layup sheet 10, thus providing the weeding capability of the layup sheet 10 as discussed above.

Furthermore, the backing layer 24 may also provide a base portion layer having a mat-interfacing surface 25 (see, e.g., FIGS. 2-2' and 4-9) that may be configured for placement onto an upper surface of a cutting mat 102 (see, e.g., FIGS. 1 3-9), such as, for example, a cutting mat with a pressure-sensitive adhesive 104 disposed upon some or all of an upper surface of the cutting mat 102, such that the layup sheet 10 may be held in place while being interfaced with and cut 26 by the processing device 100. Accordingly, one or more materials that are chosen for defining the backing layer 24 may define functional the properties of backing layer 24 that, for example, allow the mat-interfacing surface 25 of the backing layer 24 to stick in place adjacent the pressure-sensitive adhesive 102 of the cutting mat 102 and thereafter be removed, as needed, before or after cutting 26 the layup sheet 10, without damaging the sublimation layup 12 of the layup sheet 10.

Furthermore, the backing layer 24 may also be defined by one or more materials that permit heat 30 (see, e.g., FIGS. 11 and 12B) from a heating device 150, a heat plate, or another heat source to travel for sublimating sublimation material layer 16. As such, the material and thickness defining the backing layer 24 may be selected in order to provide a desired structural rigidity of the layup sheet 10 without impeding heat transfer of the heat 30 through the thickness of the layup sheet 10. Also, the material defining the backing layer 24 may functionally provide resiliency of the layup sheet 10 in order to prevent, for example, a blade 101 of the processing device 100 (e.g., a home cutting machine) to not pass there-through when the processing device 100 is, for example, set to a cutting pressure or cutting force that desirably results in the cutting blade 101 cutting through upper layers of the layup sheet 10, such as, for example, the layers defining the sublimation layup 12, and, for example the laminate layer 20. In this way, the backing layer 24 provides a carrier portion of the layup sheet 10 that allows one or more first portions of the sublimation layup 12 to be cut by, for example, the processing device 100 (e.g., a home cutting machine) and one or more second portions of the sublimation layup 12 to remain in a position that is supported by the backing layer 24 remain after weeding in order for a user to selectively arranged and customize a design before sublimation. Accordingly, one or more materials that are selected for forming the backing layer 24 may be formed to define a thickness that will withstand cutting blades 101 while also providing the handling and weeding advantages as discussed above.

In some instances, the backing layer 24 may be formed from polyethylene terephthalate (PET) or the like; such materials may be defined by a heat resistant characteristic. In some configurations, a thickness of the backing layer 24 may be between about 40 μm-60 μm. In other configurations, the backing layer 24 may be between about 45 μm-55 μm. In yet other configurations, the backing layer 24 may be about 50 μm. In some examples, the backing layer 24 may be between about 16%-24% by weight of the layup sheet 10. In other examples, the backing layer 24 may be between 18%-22% by weight of the layup sheet 10. In yet other examples, the backing layer 24 may be about 19.8% by weight of the layup sheet 10.

Accordingly, in some configurations, a total thickness of the layup sheet 10 shown at, for example, FIG. 2 may be between about 0.21 mm-0.31 mm. In other configurations, a total thickness of the layup sheet 10 may between about 0.23 mm-0.29 mm. In yet other configurations, a total thickness of the layup sheet 10 may be about 0.26 mm. In some configurations, an overall thickness and materials defined by all layers of the layup sheet 10 that may include, for example, the backing layer 24, the adhesive layer 22, the laminate layer 20, and the sublimation material carrier layer 18 may also include one or more silicone oil coatings or one or more adhesive layers between, for example, the sublimation material carrier layer 18 and the laminate layer 20.

In some instances, the selected number of layers as well as material compositions defining the layers of the layup sheet 10 are selected in order to permit a transfer of heat 30 arising from contact of the layup sheet 10 with the heating device 150 plate. In some implementations, the layup sheet 10 may be configured to be heated with the heat 30 that results in the layup sheet 10 being heated to a temperature at about 400° F. for about 240-seconds in order to sublimate the sublimation material layer 16 onto, for example, a workpiece 28 defined by, for example, a ceramic material so that a vivid, clear design may be transferred from the layup sheet 10 into the ceramic workpiece 28. Alternatively, the layup sheet 10 may be configured to be heated with the heat 30 that results in the layup sheet 10 being heated to a temperature at about 385° F. for about 40 seconds in order to sublimate the sublimation material layer 16 onto, for example, a workpiece 28 defined by, for example, a cloth material that defines, for example, a T-shirt 28 (see, e.g., FIG. 1). Accordingly, workpieces 28 that may be defined by materials other than, for example, cloth and ceramics may have to be subjected to heat 30 at a variety of temperatures and time durations in order to sublimate the sublimation material layer 16 onto a particular workpiece 28.

In some instances, a variety of temperature settings and time durations may be selected in order to sublimate the sublimation material layer 16 of the layup sheet 10 into a workpiece 28. In some implementations, a selected temperature may be in a range between about 350° F.-450° F. and a selected time duration may be in a range between about 25 second-300-seconds. Such exemplary temperatures and time durations may be sufficient for utilization with, for example, a "home" heating device 150 configured for utilization by a user that may be, for example, a novice or home crafter.

In some instances, the layup sheet 10 may be manufactured by firstly disposing or layering (e.g., printing) the sublimation material layer 16 upon the sublimation material carrier layer 18 in order to form the sublimation layup 12. Thereafter, the laminate layer 20 may be disposed or layered upon the sublimation material carrier layer 18 of the sublimation layup 12. Then, the backing layer 24 and the adhesive layer 22 may be applied to the laminate layer 20. In some instances, the adhesive layer 22 may be firstly applied to backing layer 24 to define a multilayer subassembly of the support layup 14 before the adhesive layer 22 of the multilayer subassembly of the support layup 14 is disposed upon or layered over the laminate layer 20. Additionally, in the course of manufacturing the layup sheet 10, the manufacturing process may optionally include coating the laminate layer 20 with a silicone oil after the laminate layer 20 is disposed or layered over the sublimation material carrier layer 18 and before the adhesive layer 22 of the multilayer subassembly of the support layup 14 (defined by the adhesive layer and the backing layer 24) is disposed or layered over the laminate layer 20.

Figure 13:
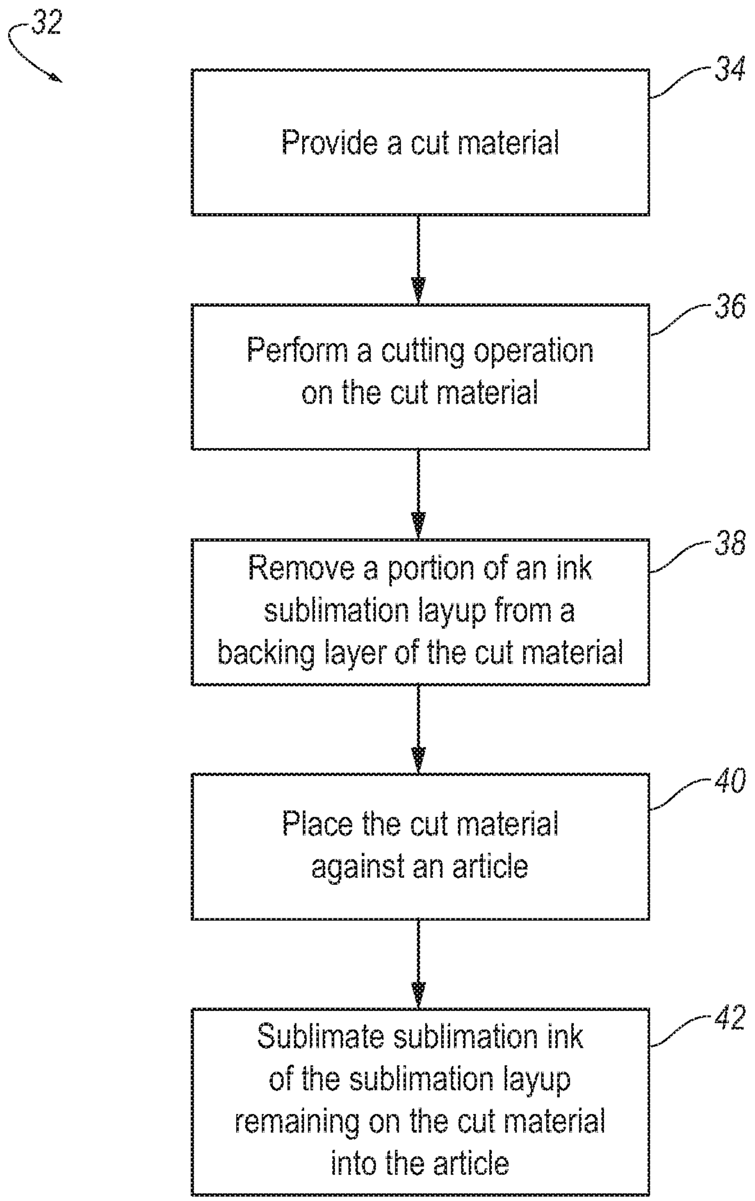
FIG. 13 is a flow-chart illustrating a method associated with the system of FIG. 1, according to the principles of the present disclosure

With reference to FIGS. 3-12D, a sublimating methodology, which is shown generally at 32 in FIG. 13 is described. Although the methodology includes several steps seen generally at 34, 36, 38, 40, and 42, one or more of the steps 34, 36, 38, 40, and 42 may be optional. For example, one or more of the components of the system (e.g., the processing device 100 and the cutting mat 102) may be optional; in some instances, the layup sheet may be pre-processed or pre-cut, and, as such, steps 36 and 38 that are related to processing or cutting the layup sheet 10 may be omitted from the methodology 32. Furthermore, although FIGS. 3-12D illustrate a method 32 of utilizing the layup sheet 10 as shown and described at FIGS. 1-2', the methodology 32 associated with FIGS. 3-12D are equally applicable to other layup sheets such as, for example, exemplary layup sheets 10*a*, 10*b*, 10*c*, 10*d*, and 10*e* that are seen at, respectively, FIGS. 14,15,16,17, and 18.

Firstly, as shown at FIGS. 1-2', a layup sheet 10 is provided 34 (see, e.g., FIG. 13). Furthermore, as also seen at FIG. 1, the layup sheet 10 may be included as a component of a system that includes one or more other components (e.g., a workpiece 28, a processing device 100, a cutting mat 102, a heating device 150, and a table 200) for performing the methodology 32.

Figure 3:
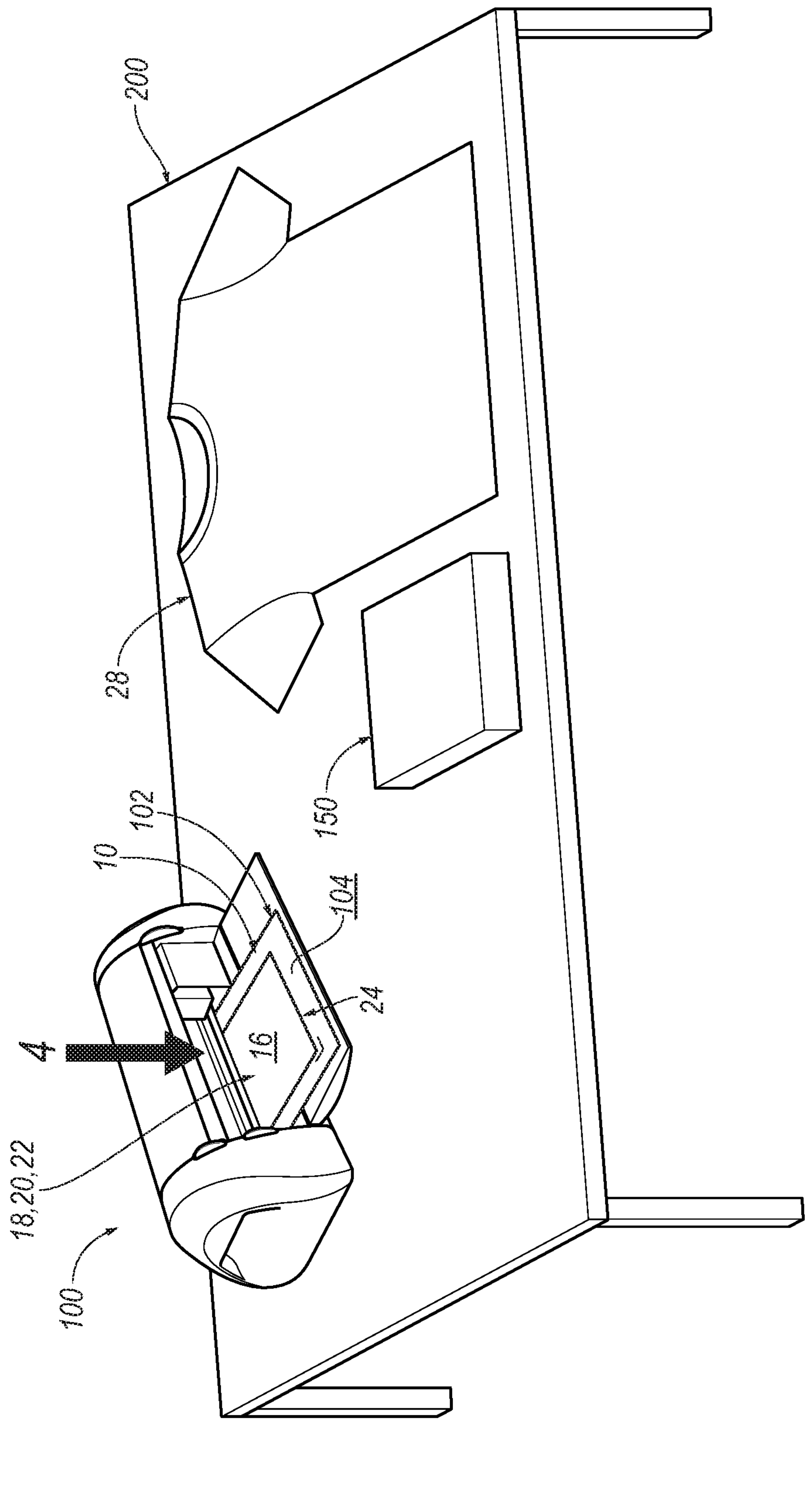
FIG. 3 is another perspective view of the system of FIG. 1 including the layup sheet arranged upon the cutting mat and both being disposed within the processing device.
Figure 4:
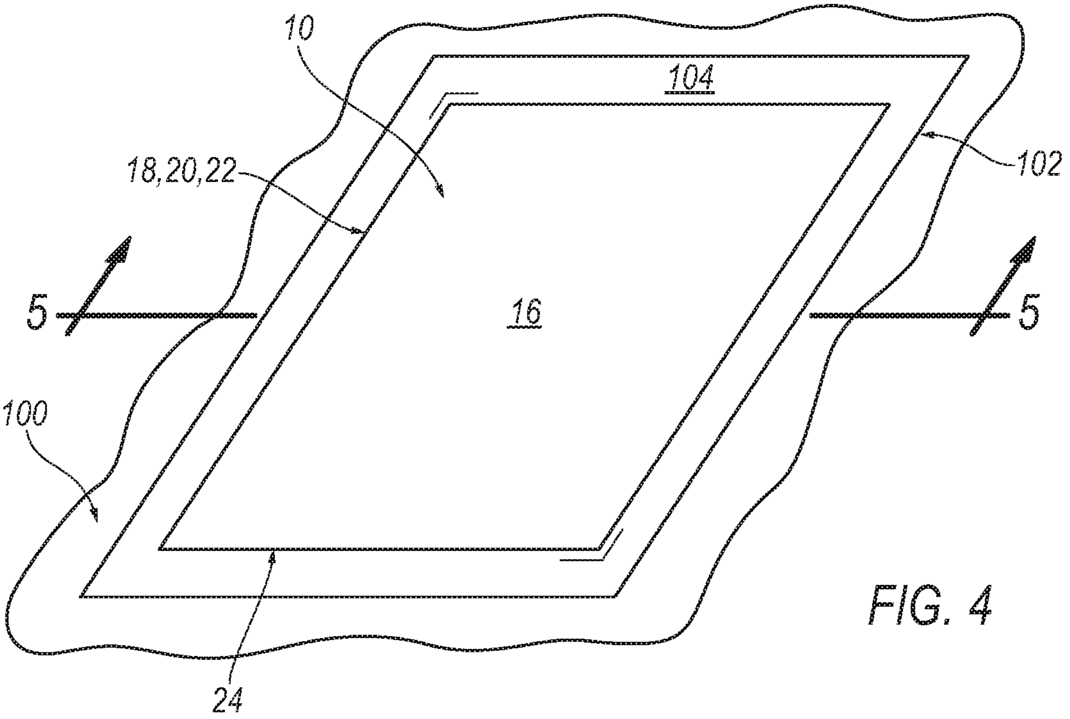
FIG. 4 is a perspective view of the layup sheet arranged upon the cutting mat that are both disposed within the processing device according to arrow 4 of FIG. 3.
Figure 5:
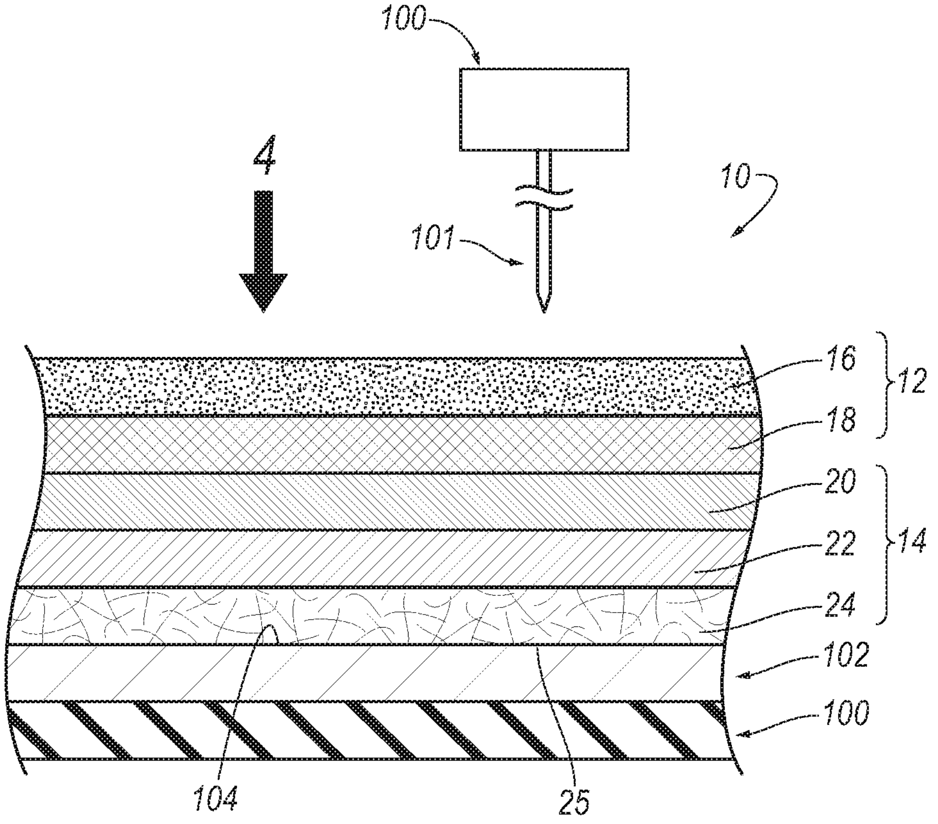
FIG. 5 is a cross-sectional view according to line 5-5 of FIG. 4.

Then, as shown at FIGS. 3-7, the method 32 may optionally include performing a cutting operation 36 on the layup sheet 10. For example, in some configurations, the layup sheet 10 may be cut 26 (see, e.g., FIGS. 4-7) with a processing device 100, such as, for example, an electronic cutting machine with a cutting blade 101 that impinges downwardly into the layup sheet 10. With reference to FIGS. 3 and 4-5, prior to performing the cutting operation 36, the layup sheet 10 may be positioned upon the cutting mat 102. After positioning the layup sheet 10 upon, for example, the pressure-sensitive adhesive 104 disposed upon some or all of an upper surface of the cutting mat 102 such that the layup sheet 10 is removably-secured to the pressure-sensitive adhesive 104 disposed upon some or all of an upper surface of the cutting mat 102, the cutting mat 102 and the layup sheet 10 are then disposed within the processing device 100 (with the sublimation material layer 16 of the layup sheet 10 opposingly-facing the blade 101 that is arranged within the processing device 100. As noted above, the backing layer 24 provides a surface that can be placed onto the pressure-sensitive adhesive 104 that defines an upper surface of the cutting mat 102. The material defining the backing layer 24 allows the rear surface of the backing layer 24 to be adhesively secured upon the upper surface of the cutting mat 102 and be selectively-removed, as needed, before or after cutting 26, without impairing the integrity of the sublimation layup 12.

Figure 6:
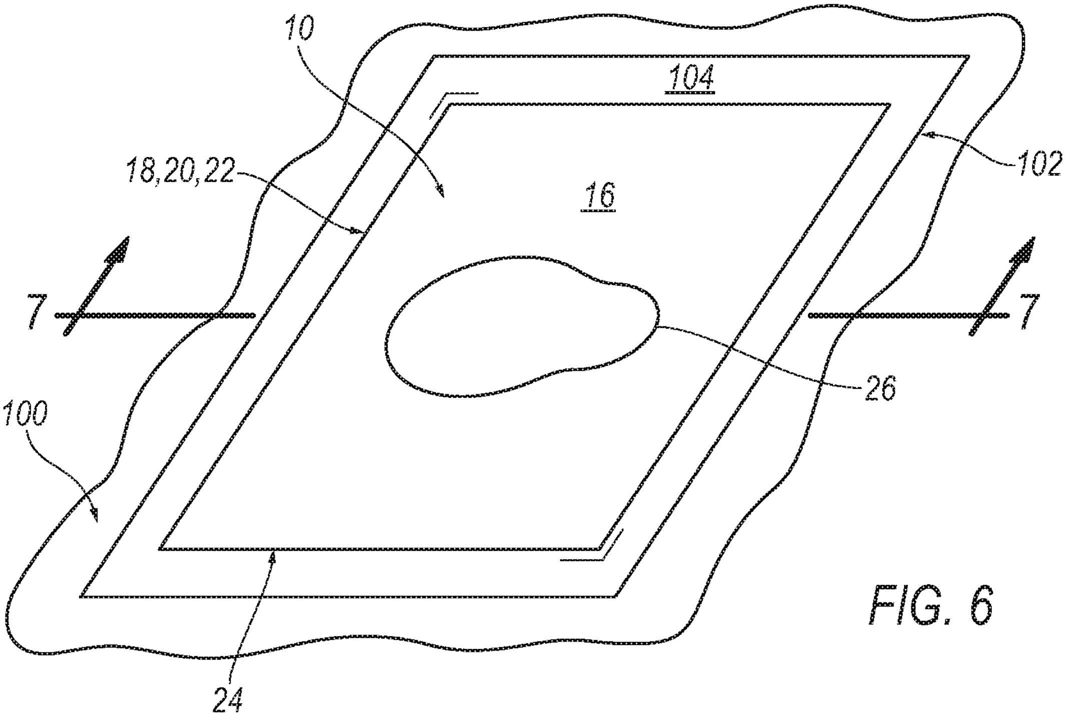
FIG. 6 is another perspective view according to FIG. 4 illustrating the layup sheet in a post-cut operation performed by the processing device.
Figure 7:
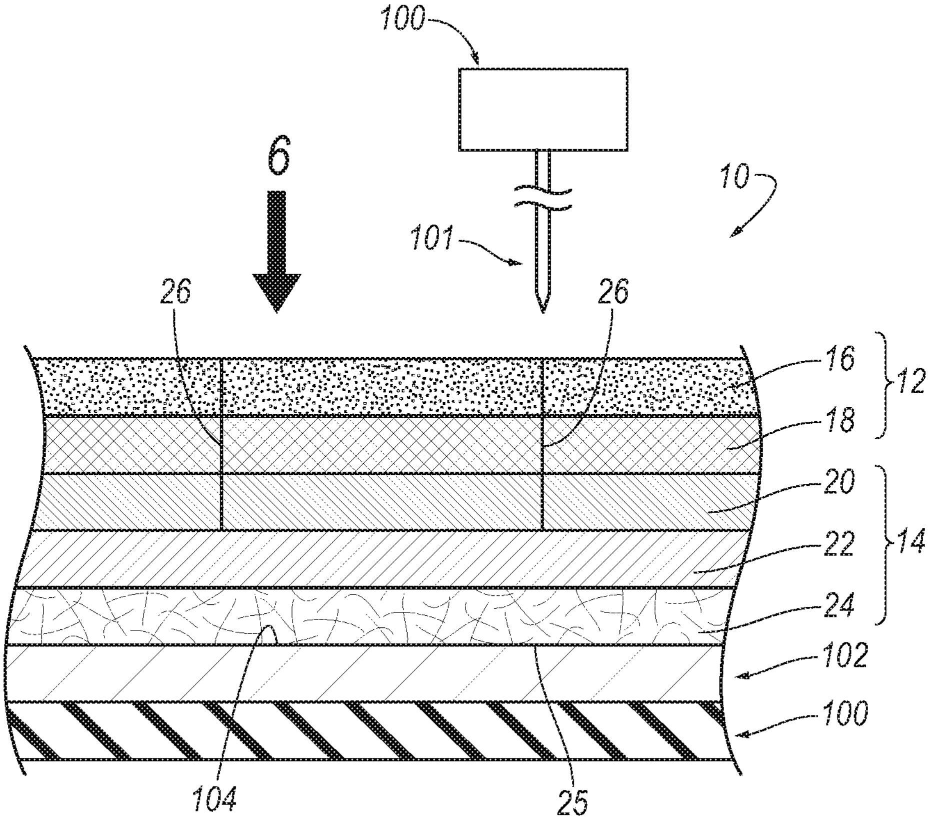
FIG. 7 is a cross-sectional view according to line 7-7 of FIG. 6.

Referring to FIGS. 6-7, the one or more cuts 26 defined by the layup sheet 10 are formed by, for example, the blade 101 of the processing device 100. In other instances, the one or more cuts 26 may be pre-formed, and, as such, step 36, which may, in some implementations, be performed by a home cutting machine (e.g., the processing device 100, may be optional, and, as such, omitted from the methodology 32.

In some implementations, the one or more cuts 26 may extend through the upper layers of layup sheet 10 that may define at least, for example, the layers defining the sublimation layup 12. In some instance, the one or more cuts 26 may extend through: (1) the sublimation material layer 16; (2) the sublimation material carrier layer 18; and (3) the laminate layer 20. In other instances, the one or more cuts 26 may be further extend partially or entirely through the adhesive layer 22. Furthermore, although the backing layer 24 may be configured to withstand the pressure setting of the cutting blade 101 of the processing device 100, the one or more cuts 26 formed by the blade 101 of the processing device 100 may also pass partially or entirely through the thickness of the backing layer 24. In some instances, the processing device 100 may be calibrated to impart a force to the blade 101 of the processing device 100 such that the blade 101 cuts through the laminate layer 20 without cutting through the adhesive layer 22 or the backing layer 24 as seen at, for example, FIG. 7. In one or more implementations, the one or more cuts 26 may pass entirely through or partially through the adhesive layer 22 but into or through the backing layer 24. Even if the blade 101 forms the one or more cuts 26 that extend into one or both of the adhesive layer 22 and the backing layer 24, the layup sheet 10 may still function properly during the act of performing sublimation 42 (see, e.g., FIG. 13)

With reference to FIG. 6, the one or more cuts 26 may define a cut perimeter that forms or creates enclosed portions or regions of the layup sheet 10. Next, as shown in FIGS. 8-9, the one or more enclosed portions or regions of the layup sheet 10 can be peeled away and removed 38 (see, e.g., FIG. 13); in some instances, the one or more enclosed portions or regions of the layup sheet 10 can be peeled away and removed 38 before or after the layup sheet 10 is removably-separated from the pressure-sensitive adhesive 104 disposed upon some or all of an upper surface of the cutting mat 102, the cutting mat 102 and the layup sheet 10.

Figure 8:
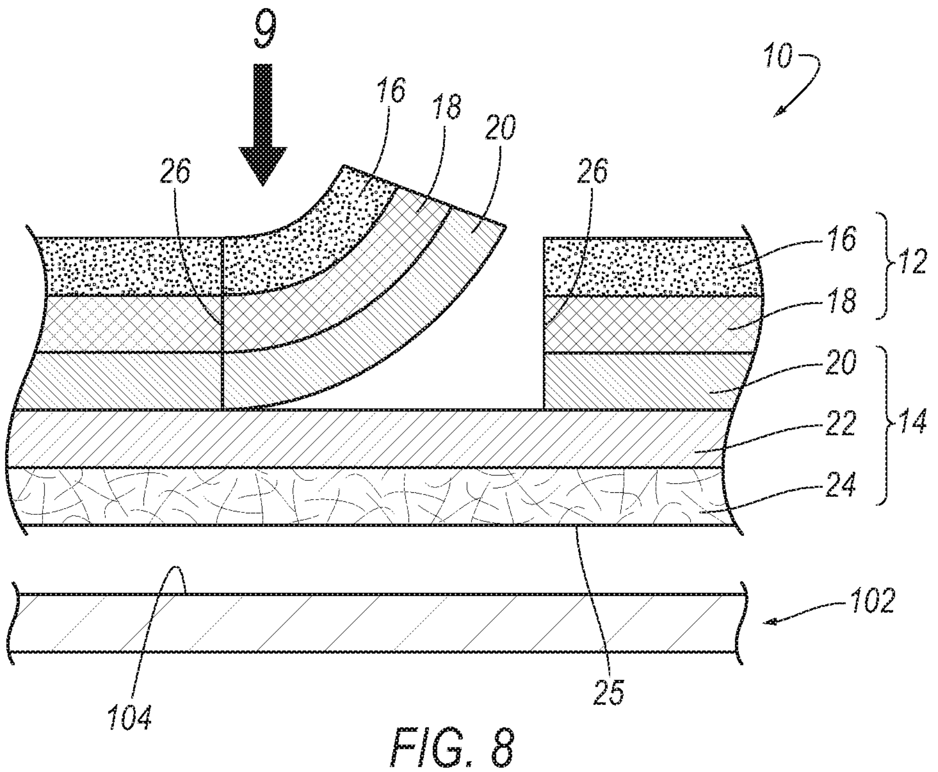
FIG. 8 is another perspective view according to FIG. 6 illustrating the layup sheet in a post-cut-and-peeled configuration.
Figure 9:
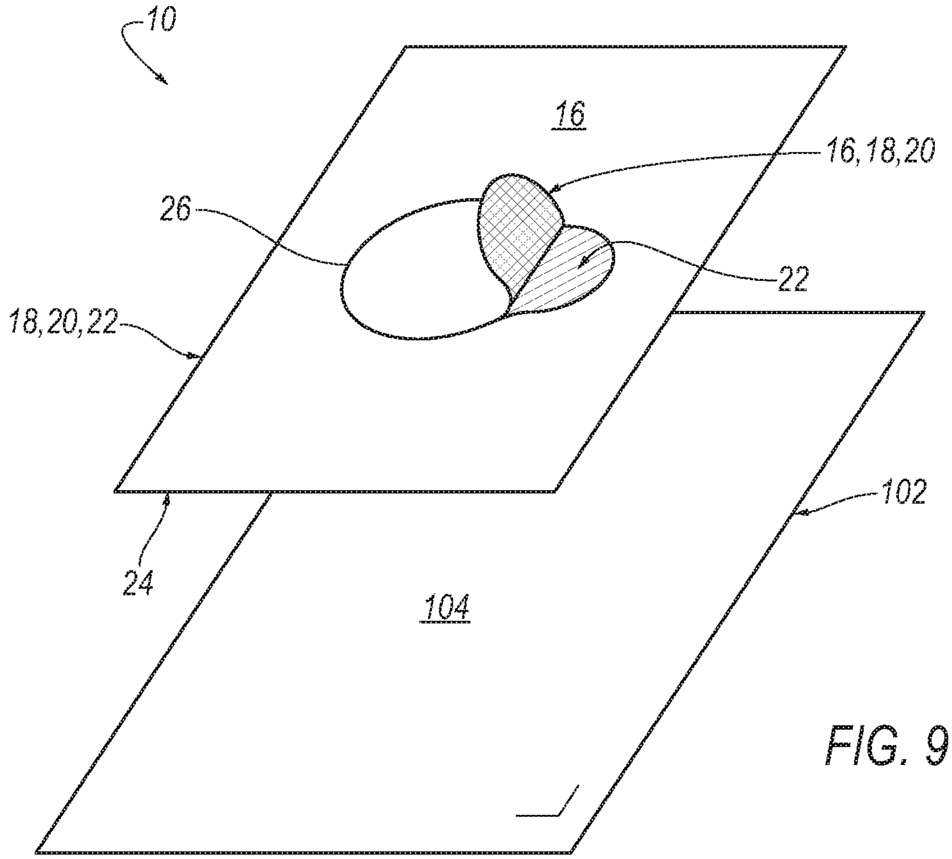
FIG. 9 is a cross-sectional view according to line 9-9 of FIG. 8.

As seen at FIG. 8, in some examples, some, but not all of the layers defining the layup sheet 10 may be peeled away and then removed 38 while some of remaining layers of the layup sheet 10 are not peeled away for sequent removal 38. In some instances, the layers of the layup sheet that are peeled away for subsequent removal 38 may include, for example: (1) the sublimation material layer 16; (2) the sublimation material carrier layer 18; and (3) the laminate layer 20. The portions of sublimation material layer 16 and sublimation material carrier layer 18 (i.e., the sublimation layup 12) corresponding in position with, and removably secured to, the portion of laminate layer 20 being removed 38 from the adhesive layer 22 and backing layer 24, is thus removed 38 as well. The above-described process of removing 38 portions of the layup sheet 10 after the cutting operation 36 is performed may be referred to as "weeding," as noted above. Weeding may be performed by hand and/or with the use of one or more weeding tools (not shown).

During weeding, the laminate layer 20 is peeled off adhesive layer 22 and thus the backing layer 24. As such, the holding power of the adhesive layer 22 is greater against the backing layer 24 than it is against the laminate layer 20, which, as noted above, may optionally include a silicone oil coating. Even if the one or more cuts 26 penetrate the adhesive layer 22 and/or the backing layer 24, as discussed above, the laminate layer 20 will still separate from the adhesive layer 22. FIG. 9 illustrates a perspective view of a portion of the layup sheet 10 being peeled off during weeding. Additionally, once the layup sheet 10 is weeded, the laminate layer 20 of remaining portions of layup sheet 10, which may be part of the desired design to be sublimated 42 into a workpiece 28, can enjoy these advantages while being removed and reapplied to the adhesive layer 22 so that such portions of a user's design can be rearranged and reoriented as desired. In this way, a user can alter custom designs as needed and maintain those portions of the design, whether rearranged or not, in relative positions on the layup sheet 10 during sublimation 42.

Figure 10:
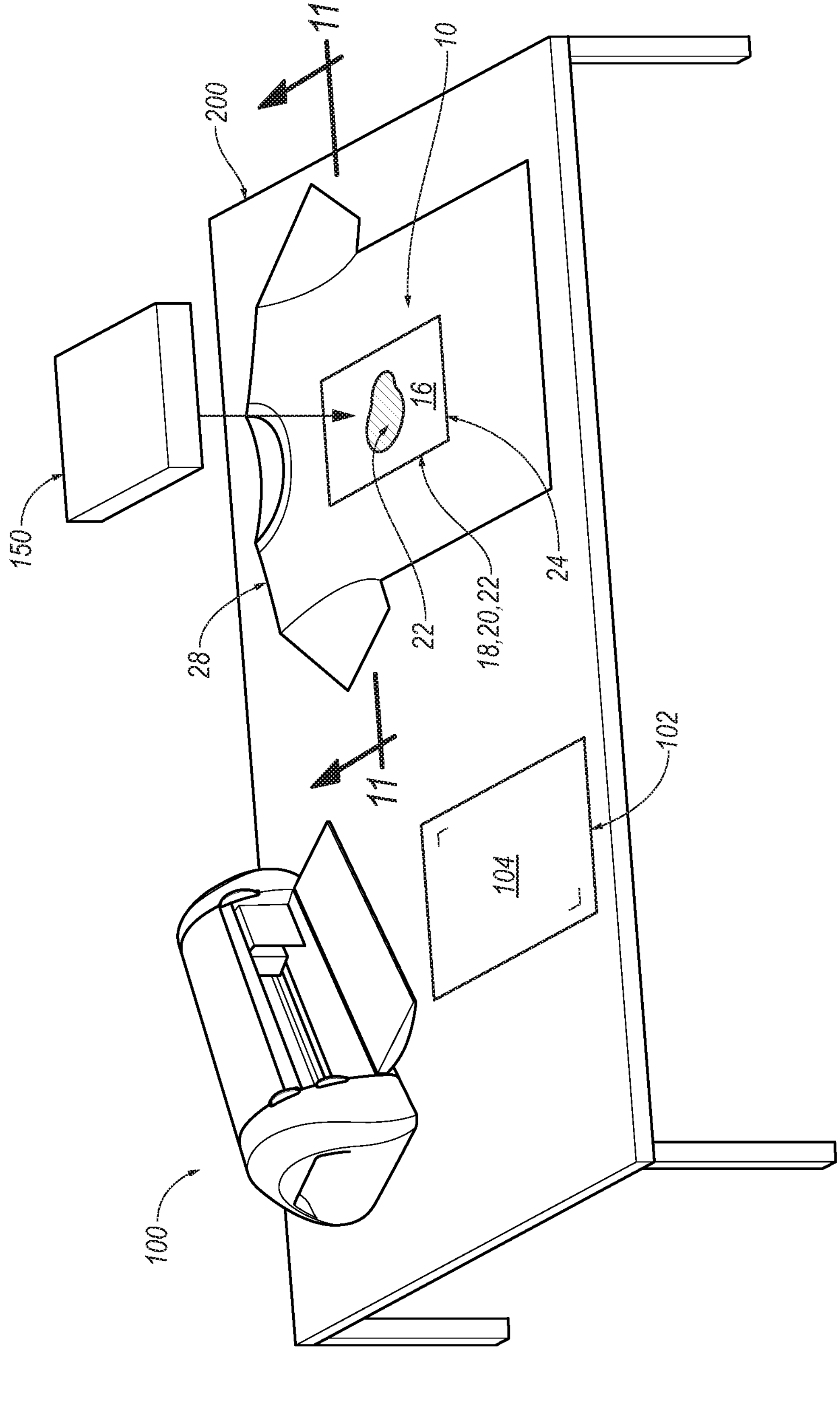
FIG. 10 is another perspective view of the system of FIG. 1 including the heating device arranged upon the cut-and-peeled layup sheet that is arranged upon the workpiece.

Referring to FIGS. 10, 11, and 12A, after the layup sheet 10 has been cut 36 and weeded 38 as desired, the layup sheet 10 can be placed 40 (see, e.g., FIG. 13) against a workpiece 28 that may be formed from any desirable material, such as, for example, a cloth material, a ceramic material, or other material. In some instances, the workpiece 28 may be arranged upon a support surface or table 200 prior to arranging the cut 36 and weeded 38 layup sheet 10 upon the workpiece 28. After being placed over or adjacent the workpiece 28, the heating device 150 may be activated (see, e.g., FIGS. 11 and 12B) such that heat 30 can be passed through the layup sheet 10 in order to sublimate 42 (see, e.g., FIGS. 12A-12D) the sublimation material layer 16 into the workpiece 28 as seen at FIGS. 11' and 12D.

With reference to FIG. 10, the workpiece 28 may define an article of clothing, such as, for example, a cloth T-shirt including a plurality of fibers. As described above, the heat 30 generated by the heating device 150 not only changes the state of the sublimation material layer 16 but also may, for example, open pores of the fibers defining the workpiece 28 as seen at FIGS. 12A-12B. Furthermore, as seen at FIGS. 12A-12C, as a result of application of the heat 30 to the layup sheet 10, the sublimation material layer 16 changes from a solid state (as seen at FIG. 12A) that is secured to the sublimation material carrier layer 18 and separates therefrom (as seen at FIG. 12B) in the form of as gas that permeates into (as seen at FIG. 12C) open-pore fibers defining the workpiece 28. After the heating device 150 is deactivated, thereby ceasing application of the heat 30 as seen at FIGS. 11' and 12D, the sublimation material layer 16 has been effectively "gassed" into the fibers defining workpiece 28, as a result of the pores of the fibers defining the workpiece 28 transitioning back to the closed state from the open state as a result of the heat 30 being removed from the workpiece 28.

In some instances, the heating device 150 may be, for example, a heat press or iron, which may be designed for home use at temperatures discussed above, can be pressed against the backing layer 24 as seen at FIG. 11. The heat 30 from such a heating device 150 passes through the various layers of layup sheet 10 in order to heat 30 and therefore sublimates 42 the sublimation material layer 16 into the workpiece 28.

As noted above, during contact between the heating device 150 and the layup sheet 10, the laminate layer 20 forms a barrier to prevent or reduce heated sublimation material layer 16 from transferring or sublimating onto the heating device 150. The heating device 150 thus is prohibited from being in direct contact with the sublimation material layer 16; accordingly, a sublimation ink that may define the sublimation material layer 16 would only be permitted to sublimate into the workpiece 28 that is arranged adjacent the opposite side of the layup sheet 10 with respect to the heating device 150. In this way, inclusion of the laminate layer 20 in the design of the layup sheet 10 may contribute to consistent preparation of a resulting image or design formed by the sublimation material layer 16 that is sublimated into the workpiece 28 as seen at FIGS. 11' and 12D. Furthermore, the backing layer 24 may provide a layer to which the design portions of sublimation layup 12 are secured so the design that is transferred to the workpiece 28 does not shift or stretch during sublimation 42.

As noted above, the materials and thicknesses of each layer of the layup sheet 10 may affect the heat transfer properties of the layup sheet 10 and are thus tuned to optimize heat transfer into the sublimation material layer 16. Also, as noted above, the laminate layer 20 may also function as a barrier layer such that gases from the sublimated sublimation material layer 16 do not pass through the laminate layer 20 and other layers above the laminate layer 20 during sublimation, such as, for example, the adhesive layer 22 and the backing layer 24. In this way, the sublimated sublimation material layer 16 gases cannot escape through the layup sheet 10, and, as a result, are predominantly directed toward for forced entry into the workpiece 28 that results in more consistent design transfers from the layup sheet 10 into the workpiece 28.

A user may customize the design transferred into the workpiece 28 by customizing the portions of the layup sheet 10 that are cut and weeded. For example, a portion of the layup sheet 10 shown at FIG. 11 may be void of the sublimation material layer 16 such that no sublimation ink will sublimate into the workpiece 28 at that portion. Also, as noted above, the remaining portions of the layup sheet 10 that include the sublimation material layer 16 can be peeled away, by separating the laminate layer 20 from the adhesive layer 22 and then reapplied to the adhesive layer 22 in different positions. In this way, a user can rearrange and customize a design even after the one or more cuts 26 are formed in the layup sheet 10 by, for example, a blade 101 of a processing device 100. Thus, implementations of the layup sheet 10 described herein enable a high level of customization right up to the time the sublimation material layer 16 of the layup sheet 10 is transferred into the workpiece 28.

With reference to FIG. 11, after the heat 30 (see, e.g., FIGS. 11 and 12B) has been applied for an appropriate duration and the sublimation material layer 16 has partially or totally sublimated into the workpiece 28, the layup sheet 10 can be lifted from the workpiece 28. In this step, the portion of the sublimation material layer 16 that has sublimated into the workpiece 28 remains in the workpiece 28 and then the sublimation material carrier layer 18 is separated therefrom when the layup sheet 10 is peeled away. The result of the described method 32 is the transfer, by sublimation, of the cut 26 design of the layup sheet 10 being transferred into the workpiece 28.

In addition to the foregoing steps of method 32 described above, some implementations of the method 32 may further include the steps of: (1) removing the cut material from the workpiece 28 after sublimating 42 the sublimation material layer 16 into the workpiece 28; and (2) leaving portions of the sublimated sublimation material layer 16, which may be defined by sublimation ink, in the workpiece 28 (see, e.g., FIGS. 11' and 12D). Furthermore, other implementations of the method 32 may include the step of rearranging portions of the layup sheet 10 after the layup sheet 10 has been cut 36 and before the sublimation material layer 16 is sublimated 42 into the workpiece 28; for example, such a step may include removing portions of the sublimation layup 12 removed with a corresponding portion of the laminate layer 20 and then reapplying said portions back onto the backing layer 24 via the adhesive layer 22 in one or more different positions.

In other implementations, the method 32 of transferring one or more sublimated portions of the sublimation material layer 16 into the workpiece 28 can also be reversed such that, for example, heat 30 from the heating device 150 is firstly applied to the workpiece 28 instead of the backing layer 24 of layup sheet 10; for example, with reference to FIG. 11, a reverse stack up where the workpiece 28 comprises ceramic materials, would include heat 30 applied to the workpiece 28, with the workpiece 28 disposed between the heat 30 and sublimated sublimation material layer 16 of the layup sheet 10. This reverse-stack-up method step may be advantageous when using home heating devices 150; in such circumstances, users may find it more difficult to apply even pressure with the heating device 150 across the workpiece 28, especially against rigid materials like ceramics. The reverse-stack up step allows for the various layers of the layup sheet 10 to be situated between the workpiece 28 and the sublimated sublimation material layer 16 to disperse pressure more evenly to the workpiece 28 in order to compensate for uneven pressure from users manually pressing the heating device 150 against the workpiece 28.

In addition to layup sheet 10 described above and shown at FIGS. 1-12D, other exemplary layup sheets 10*a*, 10*b*, 10*c*, 10*d*, and 10*e* are also described in the present disclosure at, respectively, FIGS. 14, 15, 16, 17, and 18. Accordingly, in view of the substantial similarity in structure and function of the components associated with the layup sheets 10*a*, 10*b*, 10*c*, 10*d*, 10*e* with respect to the layup sheet 10, like reference numerals are used hereinafter and in the drawings to identify like components while like reference numerals containing letter extensions (e.g., "a", "b", "c", "d", and "e") are used to identify those components that have been modified.

Figure 14:
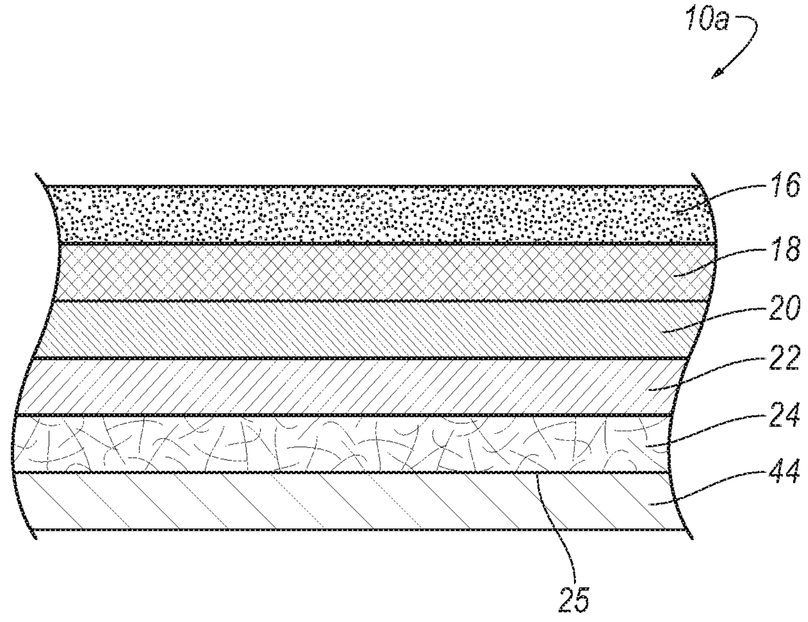
FIG. 14 is a cross-sectional view of another layup sheet according to the principles of the present disclosure.

With reference to FIG. 14, an additional printed layer 44*a* is printed on the backing layer 24*a* such that the backing layer 24*a* is disposed between adhesive layer 22*a* and the printed layer 44*a*. In such an embodiment, the printed layer 44*a* may comprise ink that is not defined by sublimation ink (i.e., the ink defining the printed layer 44*a* may be, e.g., standard printer ink or other non-sublimation ink).

In some implementations, the printed layer 44*a* may include, for example: logos; gridlines; fiducials; alignment assisting markings; or other marks or combinations thereof. Such marks may provide information regarding appropriate temperatures and durations for sublimation with a heating device 150 or iron as well as other instructions for utilizing the layup sheet 10*a*. In other implementations, the printed layer 44*a* may include marks that assist the user in aligning the layup sheet 10*a* onto a workpiece 28 or otherwise guiding the placement of layup sheet 10*a* on the workpiece 28 for performing a subsequent sublimation step 42.

Alternatively or additionally, in some configurations not shown in the Figures, the layup sheet 10*a* may also include an addition backing layer similar to backing layer 24*a* described herein on the print layer 44*a* that is shown at FIG. 14. In such implementations, the print layer 44*a* is disposed between the two backing layers 24*a*; in this way, the additional backing layer 24*a* would prevent the ink defining the print layer 44*a* from transferring onto the surface of the heating device 150 during sublimation 42.

Figure 15:
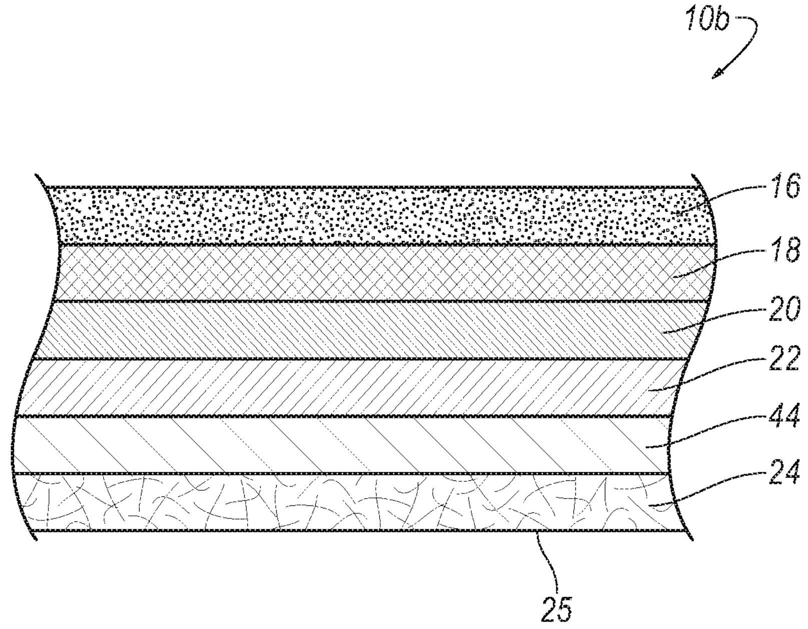
FIG. 15 is a cross-sectional view of another layup sheet according to the principles of the present disclosure.

Referring to FIG. 15, some configurations an exemplary layup sheet 10*b* may include a printed layer 44*b* disposed between the adhesive layer 22*b* and the backing layer 24*b*.

In such implementations, ink defining the printed layer 44*b* may be shielded from a heat-generating surface of the heating device 150 that is pressed into and disposed adjacent the layup sheet 10*b* during sublimation 42 by the backing layer 24*b*; such an arrangement of layers defining the layup sheet 10*b* may prevent ink defining the print layer 44*b* from transferring onto the heating surface of the heating device 150 during sublimation 42.

Additionally, the layup sheets 10*a*, 10*b* may also include other layers. In some instances, the other layers may include a silicone oil coating of the laminate layer 20*a*, 20*b* and/or one or more other adhesive layers arranged between the laminate layer 20*a*, 20*b* and the sublimation material carrier layer 18*a*, 18*b*.

Figure 16:
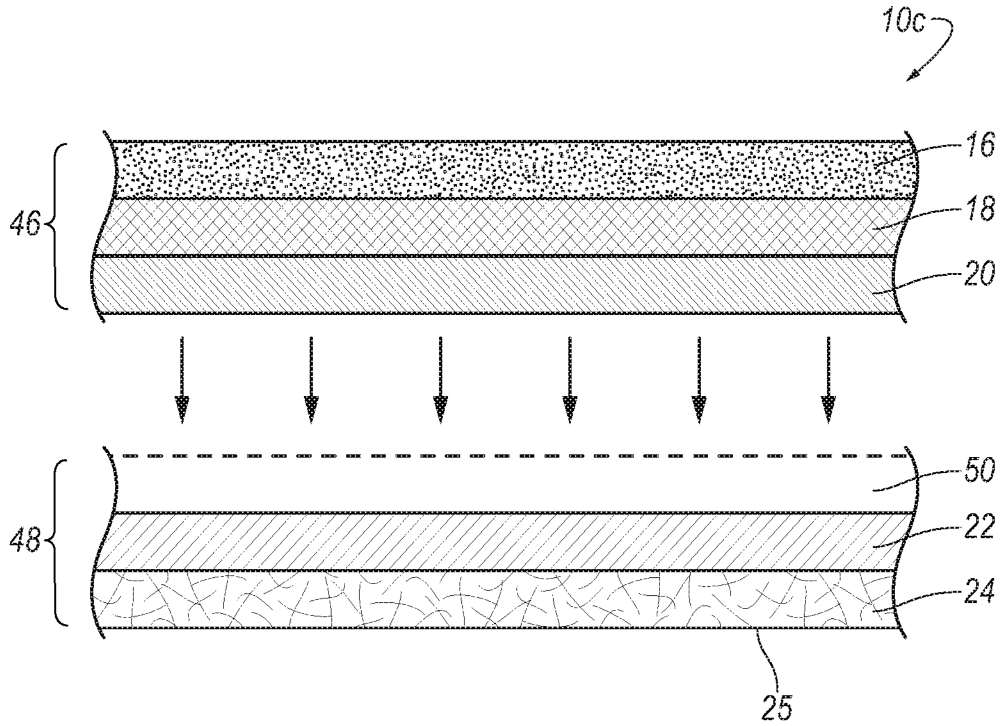
FIG. 16 is a cross-sectional view of another layup sheet according to the principles of the present disclosure.

With reference to FIG. 16, an exemplary layup sheet 10*c* may include two separate sheets of material that can be removably secured together. For example, any of the layup sheet 10*c* may include a first sheet 46*c* and a separate second sheet 48*c*. The first sheet 46*c* may include the laminate layer 20*c* below other layers, such as, for example, the sublimation material carrier layer 18*c* and the sublimation material layer 16*c* and other layers such as, for example, any adhesive layers between the laminate layer 20*c* and the sublimation material carrier layer 18*c* discussed above as well as, for example, a silicone coating on the laminate layer 20*c*. The second sheet 48*c* may include the adhesive layer 22*c*, the backing layer 24*c*, and any other layers discussed herein, such as, for example, the print layer 44*c*.

If the layup sheet 10*c* is utilized, is utilized the method 32 may include an additional step of pressing the first sheet 46*c* and the second sheet 48 together before performing the cutting step 36. Additionally, the layup sheet 10*c* may also include a removable layer 50*c* that may be disposed upon the adhesive layer 22*c* of the second sheet 48*c* in order to protect the adhesive layer 22*c* before the first sheet 46*c* is pressed onto the adhesive layer 22*c*. The user would remove the removable layer 50*c* before pressing the first sheet 46 and the second sheet 48 together in order to form a single sheet defining the layup sheet 10*c*.

Figure 17:
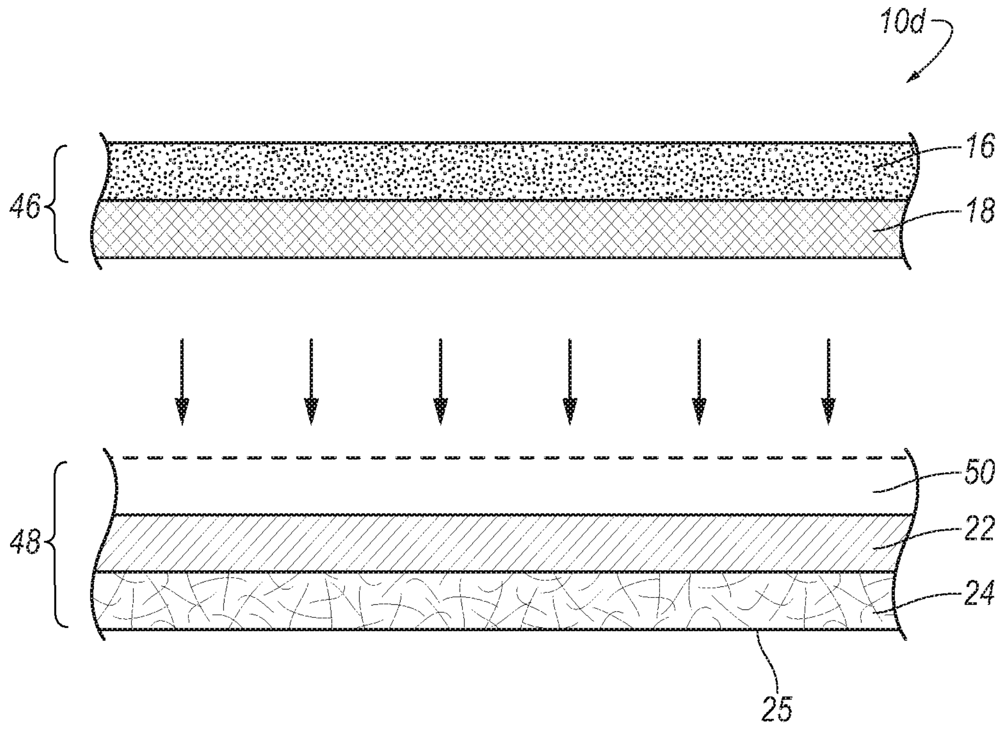
FIG. 17 is a cross-sectional view of another layup sheet according to the principles of the present disclosure.

As seen at FIG. 17, another exemplary layup sheet 10*d* may include two separate sheets 46*d* and 48*d*; however the sheets 46*d*, 48*d* may not include a laminate layer. In such configurations, the sublimation material carrier layer 18*d* may be applied directly to the adhesive layer 22*d* when the first sheet 46*d* and the second sheet 48 are pressed together. Additionally, the layup sheet 10*d* may include a removable layer 50*d* that protects the adhesive layer 22*d* until the first sheet 46*d* and the second sheet 48 are pressed together.

Figure 18:
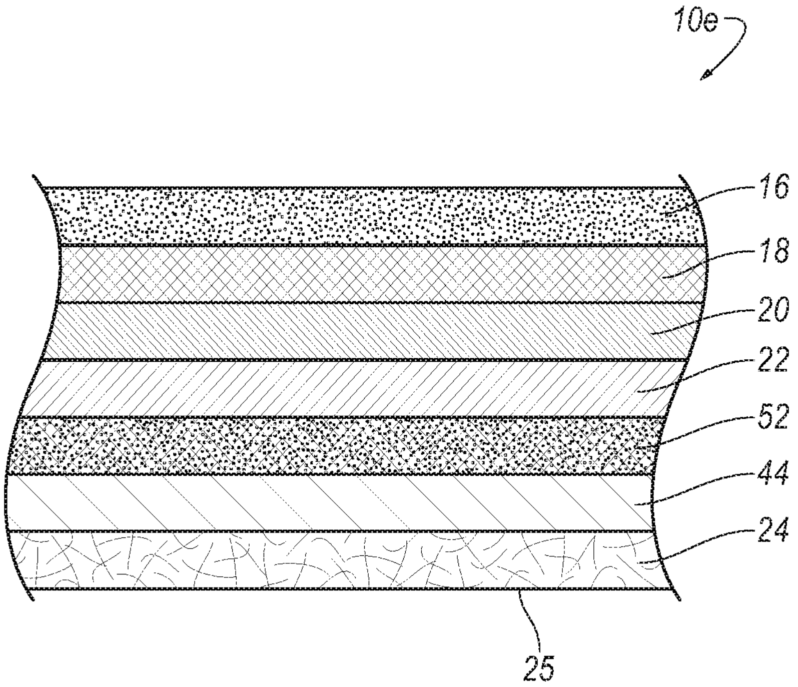
FIG. 18 is a cross-sectional view of another layup sheet according to the principles of the present disclosure.

Referring to FIG. 18, another exemplary layup sheet is shown generally at 10*e*. The layup sheet 10*e* includes a second backing layer 52*e* disposed between the print layer 44*e* and the adhesive layer 22*e*. In this way, the print layer 44*e* is sandwiched between the two backing layers 24*e*, 52*e*, which may further prevent print layer 44*e* from traveling through layers of the layup sheet 10*e* for subsequent transfer to the workpiece 28 or the heating surface of the heating device 150 during sublimation 42.

In some configurations, the second backing layer 52*e* may comprise similar or dissimilar materials and characteristics of the backing layer 24*e*. For example, in some implementations, the second backing layer 52*e* may comprise PET or other similar materials, such as, for example, other heat resistant materials and films. Furthermore, in some examples, the sum of the thicknesses of the backing layer 24*e* and the second backing layer 52*e* may be between about 40 μm-60 μm and preferably 45 μm-55 μm. In some configurations, the sum of the thicknesses of the backing layer 24*e* and the second backing layer 52*e* may be about, for example, 50 μm. In other examples, the thickness of the second backing layer 52*e* is about the same as the thickness of the backing layer 24*e*. In yet other examples, the thickness of the second backing layer 52*e* is different than the thickness of the backing layer 24*e*.

In some configurations the backing layer 24*e* and the second backing layer 52*e* together may define between about 16%-24% by weight of the layup sheet 10*e*. In other configurations, the backing layer 24*e* and the second backing layer 52*e* may define between about 18%-22% by weight of the layup sheet 10*e*. In yet other configurations, the backing layer 24*e* and the second backing layer 52*e* may define between about, for example, 19.8% by weight of the layup sheet 10*e*.

Alternatively, or in addition to the various implementations of layup sheets 10, 10*a*, 10*b*, 10*c*, 10*d*, 10*e* described herein, one or more implementations may include a perforated backing layer (not shown). A perforated backing layer may include a plurality of holes extending through the thickness of the perforated backing layer. Such a perforated backing layer may increase ventilation, and, as such, allow gases, such as, for example, moisture from ambient air or any other gases in the surrounding environment to pass through the backing layer 24, 24*a*, 24*b*, 24*c*, 24*d*, 24*e* during sublimation 42. One effect of this ventilation of gases through the backing layer 24, 24*a*, 24*b*, 24*c*, 24*d*, 24*e* may include cooling of the backing layer 24, 24*a*, 24*b*, 24*c*, 24*d*, 24*e* during sublimation 42.

In some instances, due to the cooling advantages of a perforated backing layer, the thickness of a perforated backing layer may be less than those thicknesses described above with reference to other backing layers 24, 24*a*, 24*b*, 24*c*, 24*d*, 24*e*, without negatively affecting the layup sheet 10, 10*a*, 10*b*, 10*c*, 10*d*, 10*e*. That is, the thicknesses described for the backing layer 24, 24*a*, 24*b*, 24*c*, 24*d*, 24*e*, or any layer for that matter, is in part based on the melting point and thickness of the material used. For example, a backing layer 2424*a*, 24*b*, 24*c*, 24*d*, 24*e* described above comprising, for example PET and having a thickness of between about 40 μm-60 μm will withstand the temperature ranges of between about 350° F.-450° F. for a duration of between about 25 seconds-300 seconds without melting or negatively affecting the sublimation of the layup sheet 10, 10*a*, 10*b*, 10*c*, 10*d*, 10*e*. However, a perforated backing layer of less than 40 μm may be able to withstand temperatures above 450° F. as well as heat application durations of more than 300 seconds. Alternatively, or additionally, perforated backing layers may comprise materials that are less heat resistant than PET but may be less expensive or lighter.

In addition to the foregoing, because sublimation inks are typically sensitive to humidity, some configurations of the layup sheet 10, 10*a*, 10*b*, 10*c*, 10*d*, 10*e* may include a dry-environment packaging (not shown). Dry-environment packaging reduces exposure of sublimation material layer 16, 16*a*, 16*b*, 16*c*, 16*d*, 16*e* to humidity from the air or a user's hands, either of which can cause the sublimation material layer 16, 16*a*, 16*b*, 16*c*, 16*d*, 16*e* to smear. For example, in some instances, the layup sheet 10, 10*a*, 10*b*, 10*c*, 10*d*, 10*e* may be preferably packaged in an airtight, sealed package and may include a silicone packet or other moisture absorbing material to maintain dryness within the package. The layup sheet 10, 10*a*, 10*b*, 10*c*, 10*d*, 10*e* may be packaged in a dry environment, and the packaging maintains the appropriate level of humidity during transport and storage to preserve the quality of sublimation material layer 16, 16*a*, 16*b*, 16*c*, 16*d*, 16*e*. Such packaging is advantageous for retailers and distributors as well as users because it allows them to store layup sheet 10, 10*a*, 10*b*, 10*c*, 10*d*, 10*e* for longer periods of time before sale or use. By using the dry-environment packaging described herein, the layup sheet 10, 10*a*, 10*b*, 10*c*, 10*d*, 10*e* can be placed on store shelves, in transport trucks or ships, and user's storage places for a prolonged period of time, such as, for example, a week or more.

As noted above, each of the implementations described in the detailed description above may include any of the features, options, and possibilities set out in the present disclosure, including those under the other independent implementations, and may also include any combination of any of the features, options, and possibilities set out in the present disclosure and figures. Further examples consistent with the present teachings described herein are set out in the following numbered clauses:

Clause 1: A cut material, comprising: an infusible ink layup; a backing layer; and a laminate layer disposed between the infusible ink layup and the backing layer.

Clause 2: The cut material of clause 1, wherein the infusible ink layup comprises an infusible sublimation material layer and a sublimation material carrier layer.

Clause 3: The cut layer of clause 2, wherein the laminate layer is disposed against the sublimation material carrier layer.

Clause 4: The cut material of any of clauses 1 through 3, further comprising an adhesive layer disposed between the backing layer and the laminate layer, wherein the adhesive layer removably secures the backing layer to the laminate layer.

Clause 5: The cut material of any of clauses 1 through 3, further comprising a print layer disposed between the backing layer and the laminate layer.

Clause 6: The cut material of clause 5, further comprising a print layer, wherein the backing layer is disposed between the print layer and the laminate layer.

Clause 7: The cut material of any of clauses 1 through 3, further comprising a print layer, wherein the backing layer is disposed between the print layer and the laminate layer.

Clause 8: The cut material of clause 7, further comprising an adhesive layer disposed between the backing layer and the laminate layer, wherein the adhesive layer removably secures the backing layer to the laminate layer.

Clause 9: A cut material, comprising: an infusible sublimation material layer; a sublimation material carrier layer; a laminate layer; and a backing layer. The sublimation material carrier layer is disposed between the infusible sublimation material layer and the laminate layer and the laminate layer is disposed between the sublimation material carrier layer and the backing layer.

Clause 10: The cut material of clause 9, the laminate layer comprising pulp and calcium carbonate.

Clause 11: The cut material of clauses 9 or 10, wherein the laminate layer is between about 40-60 g/m^2.

Clause 12: The cut material of any of clauses 9 through 11, the laminate layer further comprising a silicone oil coating, the silicone oil coating disposed between the laminate layer and the backing layer.

Clause 13: The cut material of any of clauses 9 through 12, wherein the backing layer comprises PET.

Clause 14: The cut material of any of clauses 9 through 13, wherein a thickness of the backing layer is between about 40-60 μm.

Clause 15: The cut material of any of clauses 9 through 14, further comprising an adhesive layer disposed between the laminate layer and the backing layer.

Clause 16: The cut material of clause 15, wherein the adhesive layer comprises a pressure sensitive adhesive.

Clause 17: A method of infusing ink into an article, comprising: providing a cut material comprising an ink sublimation layup and a backing layer, the ink sublimation layup comprising sublimation ink; performing a cutting operation on the cut material; removing a portion of the ink sublimation layup from the backing layer of the cut material; placing the ink sublimation layup against an article; and sublimating the sublimation ink into the article.

Clause 18: The method of clause 17, wherein the cut material further comprises a laminate layer disposed between the ink sublimation layup and the backing layer.

Clause 19: The method of clause 17 or 18, wherein performing a cutting operation on the cut material comprises cutting through the ink sublimation layup but not the backing layer.

Clause 20: The method of claim 18 or 19, further comprising removing a portion of the laminate layer from the backing layer after performing the cutting operation, the portion of the laminate layer being removed from the backing layer corresponding in position with, and removably secured to, the portion of the ink sublimation layup being removed from the backing layer.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately,"

"about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A layup sheet, comprising:
a sublimation material layer comprising sublimation ink;
a paper-based carrier layer;
a laminate layer;
an adhesive layer; and
a backing layer;
wherein:
the paper-based carrier layer is disposed between the sublimation material layer and the laminate layer;
the laminate layer is disposed between the paper-based carrier layer and the adhesive layer;
the adhesive layer is disposed between the laminate layer and the backing layer;
the adhesive layer remains applied to the backing layer while releasably securing the laminate layer to the backing layer; and
the layup sheet is configured to enable transfer of the sublimation ink, by sublimation, from the layup sheet into a separate article.

2. The layup sheet of claim 1, wherein an exposed surface of the layup sheet is formed by the sublimation material layer.

3. The layup sheet of claim 2, wherein the laminate layer forms a barrier configured to mitigate transfer of the sublimation ink of the sublimation material layer therethrough.

4. The layup sheet of claim 1, wherein the adhesive layer comprises a pressure sensitive adhesive.

5. The layup sheet of claim 4, wherein a holding power of the adhesive layer is greater against the backing layer than against the laminate layer.

6. The layup sheet of claim 1, further comprising printed marks on the backing layer.

7. The layup sheet of claim 6, wherein the printed marks comprise alignment assisting markings.

8. A layup sheet comprising:
a sublimation material layer comprising sublimation ink;
a paper-based carrier layer;
a laminate layer;
an adhesive layer;
a backing layer; and
printed marks on the backing layer;
wherein:
the paper-based carrier layer is disposed between the sublimation material layer and the laminate layer;
the laminate layer is disposed between the paper-based carrier layer and the adhesive layer;
the adhesive layer is disposed between the laminate layer and the backing layer; the adhesive layer remains applied to the backing layer while releasably securing the laminate layer to the backing layer; and
the sublimation material layer is configured to be pressed into direct contact with a separate article during a sublimation transfer process to transfer the sublimation ink, by sublimation, from the sublimation material layer into the separate article.

9. The layup sheet of claim 8, wherein the printed marks comprise alignment assisting markings.

10. The layup sheet of claim 8, wherein the printed marks comprise information regarding at least one of temperature and duration for the sublimation transfer process.

11. The layup sheet of claim 8, the laminate layer further comprising a silicone oil coating disposed between the laminate layer and the backing layer.

12. The layup sheet of claim 8, wherein the backing layer comprises PET.

13. The layup sheet of claim 8, wherein a thickness of the backing layer is between about 40-60 μm.

14. The layup sheet of claim 8, wherein the adhesive layer comprises a pressure sensitive adhesive.

* * * * *